US012691478B2

(12) United States Patent
Yang et al.

(10) Patent No.: US 12,691,478 B2
(45) Date of Patent: Jul. 28, 2026

(54) SYSTEMS AND METHODS FOR INTELLIGENTLY MANAGING AND CONTROLLING WASTE AND WASTEWATER IN AN AUTONOMOUS ELECTRIC POWERED TRAILER

(71) Applicant: Pebble Mobility, Inc., Sunnyvale, CA (US)

(72) Inventors: Bingrui Yang, Los Altos, CA (US); Stefan Solyom, Los Altos, CA (US); Tyler Sawyer, San Carlos, CA (US); Kevin Wong, Daly City, CA (US)

(73) Assignee: Pebble Mobility Inc., Fremont, CA (US)

( * ) Notice: Subject to any disclaimer, the term of this patent is extended or adjusted under 35 U.S.C. 154(b) by 0 days.

(21) Appl. No.: 18/744,682

(22) Filed: Jun. 16, 2024

(65) Prior Publication Data

US 2024/0416398 A1     Dec. 19, 2024

Related U.S. Application Data

(60) Provisional application No. 63/521,529, filed on Jun. 16, 2023.

(51) Int. Cl.
*B08B 9/08* (2006.01)
*B60R 15/02* (2006.01)
*B60R 15/04* (2006.01)

(52) U.S. Cl.
CPC ............... *B08B 9/08* (2013.01); *B60R 15/04* (2013.01); *B08B 2209/08* (2013.01); *B60R 15/02* (2013.01)

(58) Field of Classification Search
None
See application file for complete search history.

(56) References Cited

U.S. PATENT DOCUMENTS

2016/0023217 A1* 1/2016 Cornille .................. B60R 15/00
137/398
2018/0354432 A1* 12/2018 Van Beek ............... B60R 15/00

* cited by examiner

*Primary Examiner* — Kaj K Olsen
*Assistant Examiner* — Pradhuman Parihar
(74) *Attorney, Agent, or Firm* — Womble Bond Dickinson (US) LLP

(57) ABSTRACT

A system and method for automatically flushing a waste tank in a recreational vehicle includes automatically purging waste material from the waste tank, determining, via one or more computers, that the purging process is complete based on sensor data identifying a level of waste material within the waste tank, executing an automated flushing of the waste tank with a flushing liquid by opening a flushing valve based on determining that the purging of the waste tank is complete; determining, via the one or more computers, that the automated flushing of the waste tank is complete based on a flushing completion signal indicating that a process of the automated flushing of the waste tank is complete; and transmitting an electronic communication to a user interface that indicates a completion of the flushing of the waste tank based on determining that the automated flushing of the waste tank is complete.

10 Claims, 10 Drawing Sheets

200

Configuring a Waste Management System for Waste Disposal S210

Initiating a Draining of the Black Tank S215

Draining the Black Tank S220

Flushing the Black Tank S230

Treating the Black Tank S240

Draining the Grey Tank S250

Disconnecting the Waste Management System S260

FIG. 2

SYSTEMS AND METHODS FOR INTELLIGENTLY MANAGING AND CONTROLLING WASTE AND WASTEWATER IN AN AUTONOMOUS ELECTRIC POWERED TRAILER

CROSS-REFERENCE TO RELATED APPLICATIONS

This application claims the benefit of U.S. Provisional Application No. 63/521,529, filed 16 Jun. 2023, which is incorporated herein in its entirety by this reference.

TECHNICAL FIELD

The inventions herein relate generally to the autonomous electric trailer field, and more specifically, to a new and useful system and method for managing and controlling waste and wastewater in an autonomous electric powered trailer.

BACKGROUND

Modern vehicle trailer design and technology appear to be misaligned with the evolution, current technologies, and designs of towing vehicles. In particular, standard vehicle trailers are designed to be passive entities that only move or stop when forces generated by a tow vehicle acts on these trailers. However, as a significant sum of modern vehicles are transitioning to alternative powering mechanisms (e.g., electric power) for driving and operating these modern vehicles, driving range often becomes a concern when a passive trailer is in tow. Similarly, lesser towing-capable vehicles (e.g., sedans or the like) that may use typical combustion engines may have difficulty towing standard trailers carrying challenging loads.

Thus, there is a need in the autonomous electric trailer field to create new and useful methods and systems for an autonomous and assistive movement of an electric-powered trailer.

Additionally, modern vehicle trailers and recreational vehicles commonly include at least one waste tank for storing waste and wastewater. Typically, a user must empty and flush the waste tank by manually connecting the waste outlet of the vehicle or trailer to an external flushing water source and to an external dump site, manually opening and closing various tank and flushing valves, monitoring waste tank drainage, manually adding treatment chemicals for treating the waste tank, and manually disconnecting the waste outlet from the external flushing water source and external dump site. Such flushing operations inconvenience vehicle users by requiring continual user monitoring, and such operations also require several manual steps which may result in human error. Additionally, manual flushing operations of modern recreational vehicles and trailers may require handling of contaminated hoses and/or waste pipes.

Therefore, there is a need to automate and simplify the flushing process in recreational vehicles and trailers while reducing the possibility of user error and/or contamination. The embodiments of the present application described herein provide technical solutions that address, at least, the needs described above, as well as the deficiencies of the state of the art.

BRIEF SUMMARY OF THE INVENTION(S)

In some embodiments, a method for an automated cleaning of a waste tank in a recreational vehicle includes receiving, via one or more computers, a cleaning initiation signal for initiating a cleaning of the waste tank; automatically purging waste material from the waste tank based on receiving the cleaning initiation signal, wherein purging the waste tank includes pumping waste material out of the waste tank to a waste outlet of the recreational vehicle; determining, via the one or more computers, that the purging of the waste tank is complete based on sensor data identifying a level of waste material within the waste tank; executing an automated flushing of the waste tank with a flushing liquid based on determining that the purging of the waste tank is complete, wherein flushing the waste tank includes opening a flush inlet valve upstream of the waste tank to guide a flow of flushing liquid into an inlet of the waste tank and out through the waste outlet of the recreational vehicle; determining, via the one or more computers, that the automated flushing of the waste tank is complete based on a flushing completion signal indicating that a process of the automated flushing of the waste tank is complete; and transmitting, via the one or more computers, an electronic communication to a user interface that indicates a completion of the flushing of the waste tank based on determining that the automated flushing of the waste tank is complete.

In some embodiments, the flushing liquid comprises greywater sourced from a grey tank of the recreational vehicle, and opening the flush inlet valve causes greywater to flow from the grey tank to the inlet of the waste tank.

In some embodiments, flushing the waste tank further comprises opening a freshwater flush inlet valve upstream of the waste tank and downstream of a freshwater tank of the recreational vehicle to direct a flow of freshwater into the waste tank, and closing the freshwater flush inlet valve based on determining that at least one freshwater flush completion parameter has reached or crossed a corresponding freshwater flush completion threshold value.

In some embodiments, automatically purging waste material from the waste tank further comprises automatically opening a waste valve downstream of the waste tank and upstream of the waste outlet, and automatically activating a waste pump downstream of the waste valve and upstream of the waste outlet.

In some embodiments, determining that the purging of the waste tank is complete further comprises transmitting, via the one or more computers, a purging completion communication to the user interface that indicates a completion of the purging of the waste tank.

In some embodiments, the purging completion communication comprises a user prompt to confirm a continuation of the automated cleaning of the waste tank, and executing the automated flushing of the waste tank is based on receiving a confirmation response to the user prompt.

In some embodiments, determining that the purging of the waste tank is complete further comprises determining that a purging duration has reached or exceeded a purging duration threshold value.

In some embodiments, executing the automated flushing of the waste tank is based on determining that a level of flushing liquid contained in a flushing liquid tank of the recreational vehicle is greater than a minimum threshold level of flushing liquid.

In some embodiments, the electronic communication comprises a user prompt to confirm or skip a treatment process of the waste tank, and the method further comprises executing an automatic treatment of the waste tank with a treatment solution based on receiving, via the one or more computers, a confirmation response to the electronic communication.

In some embodiments, the method further includes executing an automatic treatment of the waste tank with a treatment solution based on determining that the automated flushing of the waste tank is complete, wherein executing the automatic treatment of the waste tank includes automatically pumping a volume of treatment chemical into the waste tank.

In some embodiments, a method for executing an automated sanitation process of a waste tank in a recreational vehicle includes receiving, via one or more computers, a waste tank flushing start signal for initiating an automated flushing of the waste tank; automatically purging waste material from the waste tank based on receiving the waste tank flushing start signal, wherein automatically purging waste material includes purging waste material out of the waste tank to a waste outlet of the recreational vehicle; determining, via the one or more computers, that the purging of waste material is complete based on sensor data identifying a level of waste material within the waste tank; and executing the automated flushing of the waste tank based on determining that the purging of waste material is complete, wherein executing the automated flushing of the waste tank includes: (i) automatically opening a greywater flush valve upstream of the waste tank to guide a flow of greywater into a greywater inlet of the waste tank and out through the waste outlet of the recreational vehicle, and (ii) automatically activating a flushing pump upstream of the waste tank and downstream of a toilet of the recreational vehicle to force a flow of freshwater flushing fluid into the waste tank.

In some embodiments, automatically purging waste material from the waste tank further comprises executing an automatic opening of a waste valve downstream of the waste tank, and executing an automatic activation of a waste pump downstream of the waste valve.

In some embodiments, executing the automated flushing of the waste tank further comprises automatically closing the greywater flush valve before automatically activating the flushing pump.

In some embodiments, executing the automated flushing of the waste tank further comprises determining that a level of greywater in a greywater tank is above a greywater flushing threshold.

In some embodiments, automatically activating the flushing pump is based on determining that a level of freshwater in a freshwater tank is above a freshwater flushing threshold.

In some embodiments, the method further comprises executing an automatic treatment of the waste tank with a treatment solution, wherein executing the automatic treatment of the waste tank includes automatically pumping a volume of treatment chemical into the waste tank.

In some embodiments, a method for an automated disposing of waste in a waste management system of a recreational vehicle includes receiving, via one or more computers, a flushing initiation signal for initiating a flushing of a waste tank; automatically purging the waste tank based on receiving the flushing initiation signal, wherein automatically purging the waste tank includes pumping waste material out of a waste outlet of the waste tank; and executing an automated flushing of the waste tank, wherein executing the automated flushing of the waste tank includes: (i) opening a greywater inlet valve upstream of the waste tank and downstream of a greywater tank of the recreational vehicle to direct a flow of greywater into the waste tank, (ii) measuring, via the one or more computers, at least one greywater flush completion parameter to determine when the at least one greywater flush completion parameter reaches or passes a corresponding greywater flush completion threshold value, and (iii) closing the greywater inlet valve based on determining that the at least one greywater flush completion parameter has reached or passed the corresponding greywater flush completion threshold value.

In some embodiments, executing the automated flushing of the waste tank further comprises opening a freshwater inlet valve upstream of the waste tank and downstream of a freshwater tank to direct a flow of freshwater into the waste tank, and closing the freshwater inlet valve based on determining that at least one freshwater flush completion parameter has reached or passed a corresponding freshwater flush completion threshold value.

In some embodiments, automatically purging the waste tank further comprises: (i) automatically opening a waste outlet valve downstream of the waste outlet of the waste tank, and (ii) automatically activating a pump downstream of the waste outlet that forces waste out of the waste outlet and through the waste outlet valve.

In some embodiments, executing the automated flushing of the waste tank further comprises determining that a level of greywater in the greywater tank is above a greywater flushing threshold.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the invention(s) is not intended to limit the invention(s) to these preferred embodiments, but rather to enable any person skilled in the art to make and use the invention(s).

1. Autonomous Electric-Powered Trailer System

Figure 1A:
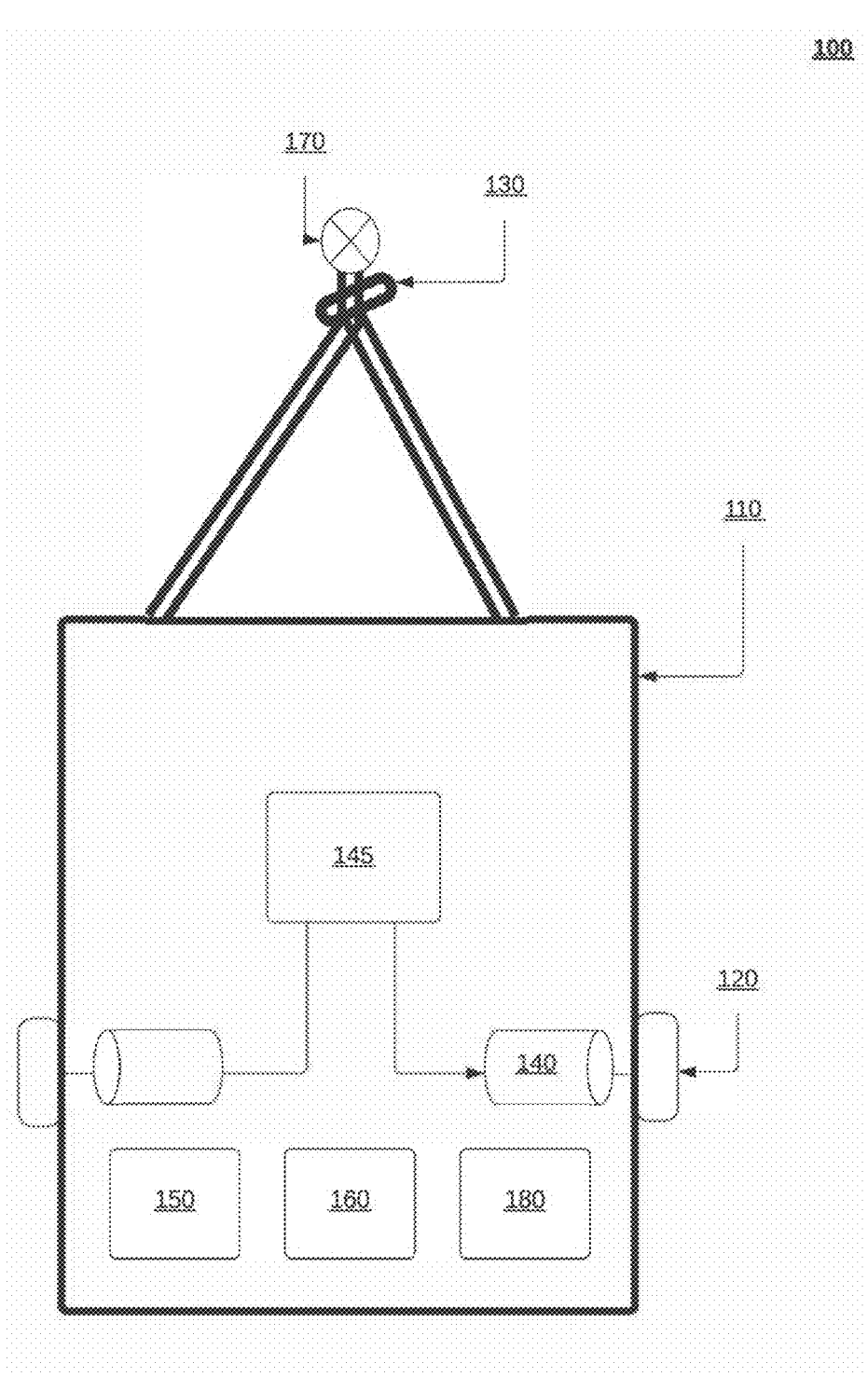
FIG. 1A illustrates a schematic representation of a system 100 in accordance with one or more embodiments of the present application.

As shown by reference to FIG. 1A, an autonomous electric-powered trailer system 100 for assistive driving transport with a tow entity (e.g., a tow vehicle) and, in some circumstances, while detached from a tow entity, autonomous transport or movement may include a chassis 110 of an AEP trailer system 100, a plurality of wheels 120 (motorized/unmotorized), a steerable axle/caster wheel 130, one or more electric motors 140 powered by a battery subsystem 145, sensor suite 150, an autonomous trailer control subsystem 160, a coupler (e.g., tow vehicle hitch receiver) 170, a trailer-tow vehicle communication interface or subsystem 180, and a water and waste management subsystem 190.

The autonomous electric-powered trailer system 100 may preferably be implemented in conjunction with a tow vehicle or the like having an independent propulsion system. In a tethered driving operation, an autonomous driving behavior of the AEP trailer system 100 may be responsive to and/or informed by an initial driving behavior of the tow vehicle. In such cases, the one or more sensing devices 150 of the AEP trailer system 100 may operate to identify driving activity and/or operations of a tow vehicle tethered to the AEP trailer system 100 and responsively compute autonomous movement and/or driving control instructions for the AEP trailer system 100.

1.10 Trailer Chassis

The chassis 110 of the AEP trailer system 100 preferably comprises a load-bearing framework of an artificial object that preferably structurally supports the artificial object in its construction and function. That is, in some embodiments, the chassis 110 may be an undercarriage used to transport a load or container over the road. In one or more embodiments, the chassis 110 may include a frame having a composition of one or more materials, which may include a combination of metals (e.g., steel) and/or wood-based components. The chassis no preferably additionally includes one or more axles that support the attachment of the plurality of wheels 120 and the caster wheel 130, a trailer tongue or the like that extends from a main body of the chassis, a coupler arranged at a distal end of the trailer tongue, a cranking or jacking mechanism arranged along the trailer tongue.

1.20 Wheels

The plurality of wheels 120 of the AEP trailer system 100 are preferably attached to the one or more axles of the chassis 110. In some embodiments, the plurality of wheels 120 may be powered by and/or include the one or more motors 140 and may include a braking system.

In a first implementation, each of the plurality of wheels 120 or a subset of the plurality of wheels 120 may include or may be powered at least one of the one or more motors 140. In this first implementation, the at least one motor of a given wheel may be independently powered and operated to enable an independent movement of the given wheel. While the at least one motor may enable an independent operation of the given wheel, it shall be recognized that each motor of each wheel may be operated in coordination or in concert to enable various driving operations of the AEP trailer system 100.

In a second implementation, each pair (i.e., left wheel/right wheel defining a pair) of the plurality of wheels 120 may be powered by a single motor of the one or more motors 140. In such embodiments, the single motor may be arranged along an axle onto which each distinct wheel of the pair of wheels may be arranged at each respective end of the axle. In this second implementation, the pair of wheels may be operated in a coordination based on an operation of the single motor.

It shall be recognized that, in some embodiments, the AEP trailer system 100 may include a plurality of axles in which only a subset of the plurality of axles includes the one or more motors 140.

1.30 Steerable Axle|Caster Wheel

The steerable axle 130 preferably functions to support or enable directional movements of the AEP trailer system 100. In one or more embodiments, the steerable axle 130 includes a caster wheel. In one implementation, the steerable axle 130 may be powered by an independent motor of the one or more motors 140 arranged along the steerable axle 130 to rotate the caster wheel. In another implementation, the steerable axle 130 may be passive and a movement of the caster wheel may be encouraged by a movement of one or more of the plurality of wheels 120 when powered by the one or more motors 140.

Additionally, or alternatively, the steerable axle 130 may include a cranking or jacking mechanism (not shown) that operates to lift and lower the steerable axle 130. In one or more embodiments, the cranking or jacking mechanism may be electric-powered and an operation thereof automated and/or controlled by the AEP trailer system 100. In a non-limiting example, the cranking or jacking mechanism may be operated during one or more automated tethering or automated hitching operations in which the AEP trailer system 100 operates to automatically hitch its coupler to a tow hitch or tethering mechanism of a tow entity. In some embodiments, the jacking mechanism may enable or semi-manual (e.g., external electronic jacking interface of the AEP trailer) or manual intervention (e.g., a manual crank) for lifting and/or lowering a coupler of the AEP trailer system 100 to a tethering mechanism.

1.40 Electric Motors

The one or more electric motors 140 of the AEP trailer system 100 preferably function to produce torque for turning one or more of the plurality of wheels 120, the steerable axle 130, and/or the jacking mechanism of the AEP trailer system 100. In one or more embodiments, the one or more electric motors 140 may be powered by energy outputs of the battery subsystem 145 to generate the torque outputs for operating one or more mechanisms (e.g., wheels, jack, etc.) of the AEP trailer system 100.

As mentioned above, the one or more motors 140, in varying embodiments, may be arranged along the chassis 110 and/or the plurality of wheels 120 in any suitable manner for achieving a steering and driving of the AEP trailer system 100. In one implementation, the one or more motors 140 may be arranged along an axle shared between pairs of wheels. In another implementation, the one or more motors 140 may be arranged on distinct, independent axles that uniquely power each respective wheel of the plurality of wheels 120. In a further implementation, a combination of the aforementioned implementations may be combined to optimize driving and/or steering operations of the AEP trailer system 100.

1.45 Battery Subsystem

The battery subsystem 145 is preferably in electrical communication with each of the electric-powered components of the AEP trailer system 100 and may function to provide energy outputs to the electric-powered components based on control signals from the autonomous trailer control subsystem 160.

Additionally, or alternatively, the battery subsystem 145 may include a battery stack that may include a plurality of distinct batteries or energy storage devices. In one or more embodiments, the battery stack may include a plurality of distinct batteries in which subsets of one or more batteries may be dedicated to a distinct electric-powered component of the AEP trailer system 100. In this way, power consumption of various electronic components of the AEP trailer system 100 and/or the over consumption of the electric-powered components may be intelligently managed to increase safety and/or efficiency of the AEP trailer system 100.

1.50 Sensing Devices

The sensor suite 150 preferably functions to observe and/or collect data from one or more components of the AEP trailer system 100, an environment and/or circumstances surrounding the AEP trailer system 100 and/or a tow entity, a coupler component and/or coupled subsystem, and/or the like. Accordingly, in one or more embodiments, the sensor suite 150 may function to periodically and/or continuously measure a behavior of static and dynamic objects in an environment of the AEP trailer system 100, a behavior of a tow entity (in either a tethered or untethered state) and measure self-behavior.

In a preferred embodiment, the sensor suite 150 or onboard sensors (e.g., computer vision system, LIDAR, RADAR, ultrasonic sensors, pressure sensors, wheel speed sensors, encoders, IMU, GPS, cameras, etc.) are in operable communication with the autonomous trailer control subsystem 160. Additionally, or alternatively, the sensor suite 150 may comprise one or more strain gauge load sensors for measuring towing load forces acting on the AEP trailer. These one or more strain gauge load sensors, in some embodiments, may be mounted on a tongue of the AEP trailer, mounted on an A-frame coupled to the AEP trailer tongue, and/or mounted at a plurality of other locations on the AEP trailer chassis 110.

The sensor suite 150 preferably includes sensors used to perform autonomous trailer operations (such as automated tethering, towing propulsion assist, autonomous driving, and/or the like) and data capture regarding the circumstances surrounding the AEP trailer system 100 as well as data capture relating to operations of the AEP trailer system 100 but may additionally or alternatively include sensors dedicated to detecting maintenance needs of the AEP trailer system 100. For example, the sensor suite 150 may include motor feedback and/or diagnostic sensors or an exterior pressure sensor strip. As another example, the sensor suite 150 may include sensors dedicated to identifying a position of a tethering nexus (e.g., a tow hitch or the like) relative to a position of the AEP trailer system 100.

1.60 Autonomous Trailer Control Subsystem

The AEP trailer system 100 preferably includes an autonomous trailer control subsystem 160 (e.g., an onboard computer operably integrated with the AEP trailer) but can additionally or alternatively be decoupled (e.g., not onboard) from the AEP trailer system 100 (e.g., a user mobile device operating independent of the autonomous trailer). That is, in one or more embodiments, parts of the autonomous trailer control subsystem 160 may be operated and/or performed remotely by one or more external computing systems (e.g., a mobile user device, remote cloud computing system) that be may in operable control communication with the AEP trailer system 100 (e.g., via a network, short-range communication system, and the like).

Additionally, or alternatively, the autonomous trailer control subsystem 160 may include a processing system (e.g., graphical processing unit (GPU), central processing unit (CPU), or any suitable processing circuitry) as well as memory and a sensor fusion system. The memory can be short term (e.g., volatile, non-volatile, random-access memory or RAM, etc.) and/or long term (e.g., flash memory, hard disk, etc.) memory.

In one or more embodiments, the sensor data fusion system may function to synthesize and process sensor data for deriving artifacts (e.g., load measurements, tow vehicle acceleration/braking, and the like), predicting the presence, location, classification, and/or path of objects and features of the environment of the AEP trailer system 100. In various embodiments, the sensor data fusion system may function to incorporate data from multiple sensors and/or data sources, including but not limited to cameras, LIDARS, radars, remote data feeds (Internet-based data feeds, weather feeds, and the like), and/or any number of other types of sensors.

As discussed below, the AEP trailer system 100 may additionally include a trailer communication interface 180 that includes a wireless communication system (e.g., Wi-Fi, Bluetooth, cellular 3G, cellular 4G, cellular 5G, multiple-input multiple-output or MIMO, one or more radios, or any other suitable wireless communication system or protocol), a wired communication system (e.g., modulated powerline data transfer, Ethernet, or any other suitable wired data communication system or protocol), sensors, and/or a data transfer bus (e.g., CAN, FlexRay). In a preferred embodiment, the autonomous trailer control subsystem 160 may operate to interact with and/or operably control any or one or more of the identified components or modules described herein.

Additionally, or alternatively, the AEP trailer system 100 may be in operable communication with a remote or disparate computing system that may include a user device (e.g., a mobile phone, a laptop, etc.), a remote server, a cloud server, or any other suitable local and/or distributed computing system remote from the AEP trailer system 100. The remote computing system may preferably be connected to one or more systems of the autonomous trailer through one or more data connections (e.g., channels), but can alternatively communicate with the AEP trailer system in any suitable manner.

The autonomous trailer control subsystem 160 preferably functions to control the AEP trailer system 100 and process sensed data from a sensor suite (e.g., a computer vision system, LIDAR, flash LIDAR, wheel speed sensors, GPS, etc.) of the AEP trailer system 100 and/or other sensors to determine states of the AEP trailer system 100 and/or states of agents in an operating environment of the AEP trailer system 100. Based upon the states of the autonomous trailer and/or agents in the operating environment and programmed instructions, the autonomous trailer control subsystem 160 preferably modifies or controls behavior of AEP trailer system 100.

The autonomous trailer control subsystem 160 is preferably a general-purpose computer adapted for I/O communication with AEP trailer control systems and sensor systems but may additionally or alternatively be any suitable computing device.

Additionally, or alternatively, the autonomous trailer control subsystem 160 is preferably connected to the Internet via a wireless connection (e.g., via a cellular link or connection). Additionally, or alternatively, the autonomous trailer control subsystem 160 may be coupled to any number of wireless or wired communication systems.

The positioning system processes sensor data along with other data to determine a position (e.g., a local position relative to a map, an exact position relative to lane of a road, AEP trailer heading, velocity, position relative to a tow vehicle, etc.) of the AEP trailer system 100 relative to the environment. Additionally, or alternatively, in an un-tethered state (e.g., the AEP trailer is disconnected from a tow hitch), the guidance system processes sensor data along with other data to determine a path for the AEP trailer system 100 to follow, e.g., in circumstances in which the AEP trailer system 100 may autonomously or semi-autonomously travel to a tow hitch or towing nexus of a tow vehicle. Additionally, or alternatively, in some examples, the AEP trailer system 100 may obtain or collect path planning data from an associated tow vehicle.

In various embodiments, the controller may function to implement machine learning techniques to assist the functionality of the controller, such as feature detection/classification, obstruction mitigation, route traversal, mapping, sensor integration, ground-truth determination, and the like.

Additionally, or alternatively, in some embodiments, the autonomous trailer control subsystem may include a vision perception system or module that include extensible machine learning-based objection classification sub-modules trained for predicting and/or classifying varying areas (e.g., a rear) of a tow entity, a position of tethering nexus, and/or the like.

Additionally, or alternatively, the vision perception system or module may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, Mobile-BERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the AEP trailer system 100. Further, any suitable model (e.g., machine learning, non-machine learning, etc.) may be implemented in the various systems and/or methods described herein.

1.80 Trailer-Tow Vehicle Communication Interface

The trailer-tow vehicle communication interface 180 preferably enables the AEP trailer system 100 to communicate and/or exchange data with systems, networks, and/or devices external to and/or that may be independent of the AEP trailer system 100. Preferably, the trailer-tow vehicle communication interface 180 enables one or more entity devices and/or user devices/applications to communicate directly with the AEP trailer system 100. The trailer-tow vehicle communication interface 180 preferably includes one or more of a cellular system (or any suitable long-range communication system), direct short-wave radio, vehicle-to-vehicle (V2V) communication, vehicle-to-everything (V2X) communication, or any other suitable short-range communication system.

1.90 Water and Waste Management Subsystem

Figure 1B:
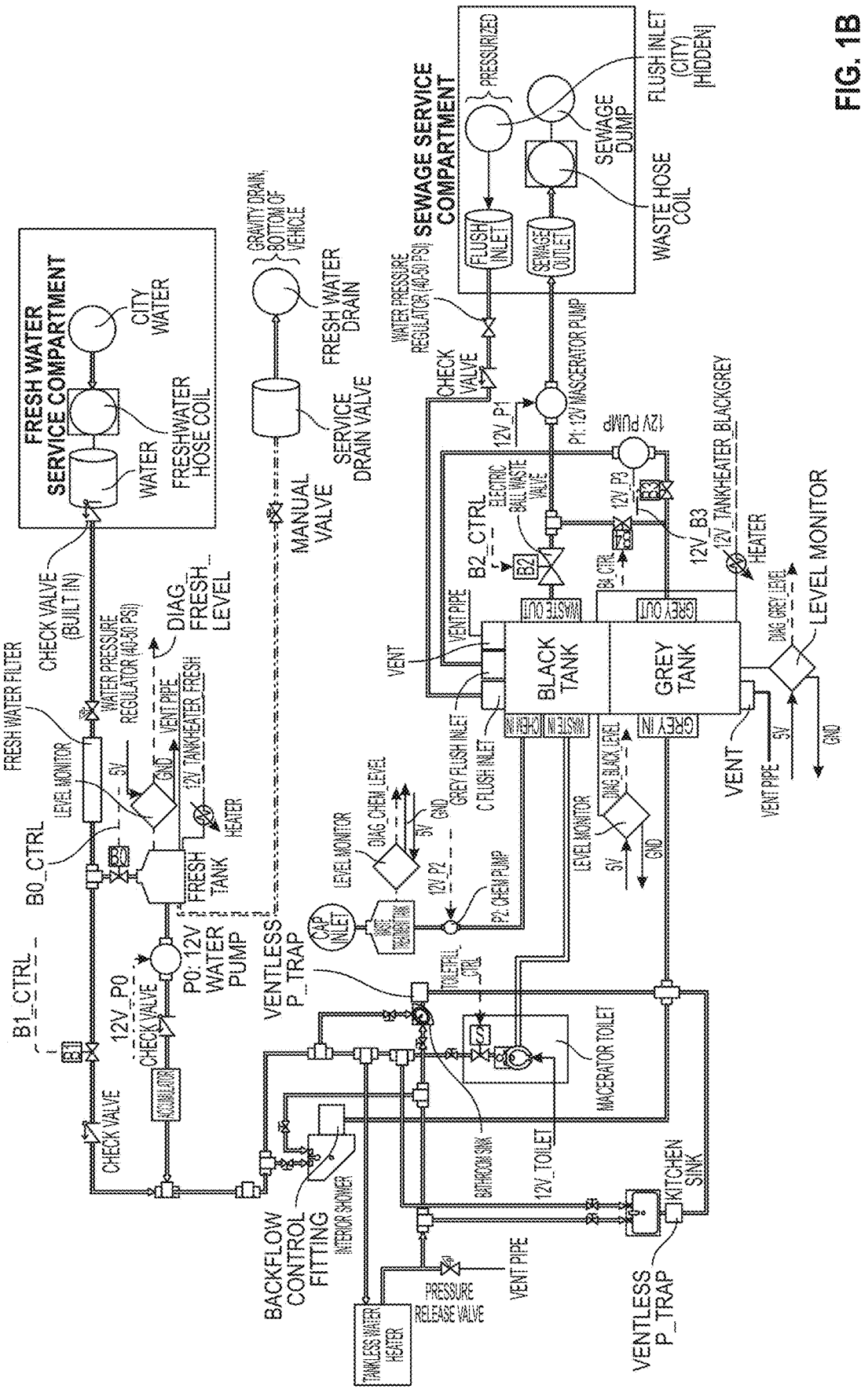
FIGS. 1B-1D illustrate example schematics of water and waste management subsystems in accordance with one or more embodiments of the present application.
Figure 1C:
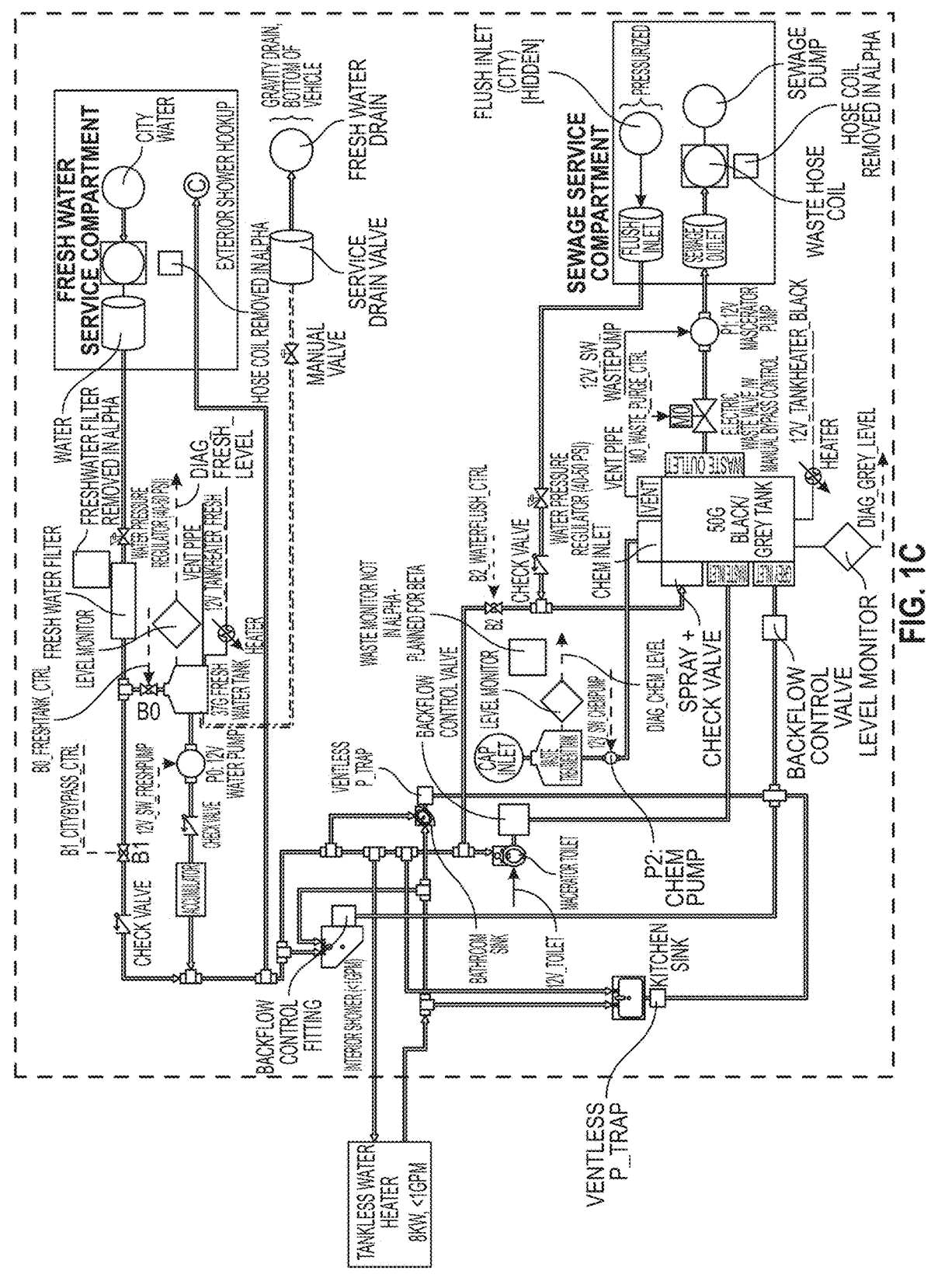
Figure 1D:
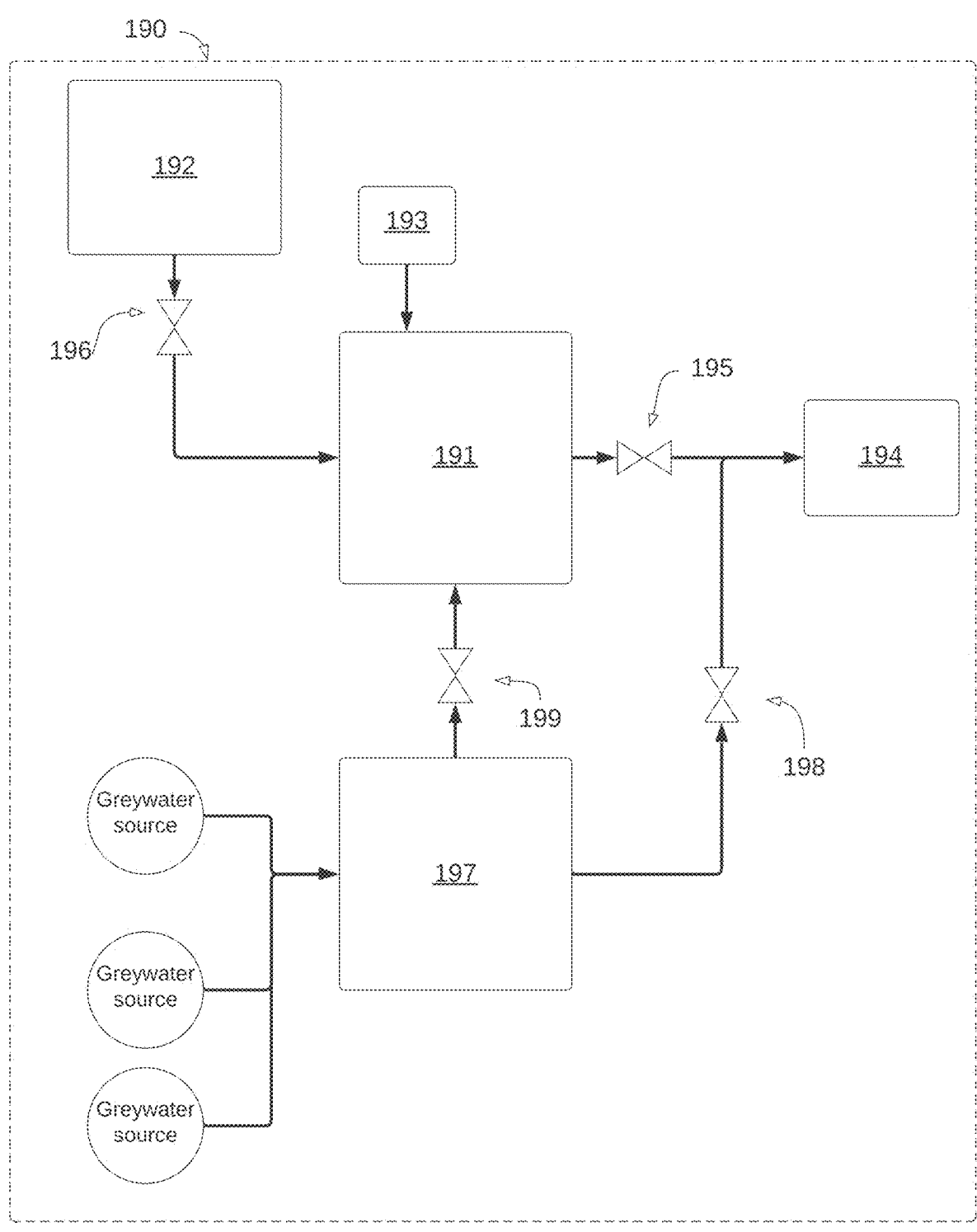

The water and waste management subsystem 190 preferably functions to store, manage, and control freshwater, waste, and wastewater, in the AEP trailer, as shown by way of example in FIGS. 1B-1D. In some embodiments, as shown in FIG. 1D, the water and waste management subsystem 190 may include a black tank 191, a freshwater tank 192, a treatment subsystem 193, a sewage outlet 194, a waste valve 195, and a flushing valve 196. In some embodiments, water and waste management subsystem 190 may also include grey tank 197, greywater waste valve 198, and greywater flushing valve 199. Additionally, in some embodiments, water and waste management subsystem 190 may include one or more sinks, toilets, and other plumbing fixtures for providing water for and/or receiving wastewater and waste generated by one or more users of the AEP trailer. It shall be noted that, while in some embodiments water and waste management subsystem 190 may be implemented in the AEP trailer, water and waste management subsystem 190 may be implemented in any suitable trailer, recreational vehicle, and/or other vehicle or structure for the purpose of storing, managing, and controlling freshwater, waste, and wastewater.

1.91 Black Tank

The black tank 191 preferably functions to receive and store liquid and solid waste and/or wastewater from one or more sources of waste, such as one or more toilets of water and waste management subsystem 190. Additionally, in some embodiments, black tank 191 may function as a black/grey tank to store wastewater from one or more sources of greywater including, but not limited to, one or more sinks and/or one or more showers of the water and waste management subsystem 190, as shown by way of example in FIG. 1C. As used herein, greywater may relate to wastewater generated during use of sinks, baths, showers, washing machines, dishwashers, and/or the like. Additionally, or alternatively, in some embodiments, water and waste management subsystem 190 may include a distinct grey tank 197 (as shown in FIGS. 1B and 1D) for receiving and storing greywater. In some embodiments, water and waste management subsystem 190 may include a plurality of black tanks 191.

Black tank 191 preferably includes one or more of: a chemical inlet that may allow a flow of treatment chemicals into black tank 191, one or more flushing inlets or flushing sprays that may allow and/or direct a flow of flushing water into black tank 191, a waste inlet that may allow liquid and solid waste into black tank 191, a greywater inlet that may allow a flow of greywater into black tank 191 from one or more sources of greywater, a heater that may provide heating to black tank 191, a waste outlet that may allow a flow of waste and wastewater out of black tank 191, and a ventilation outlet or ventilation pipe for providing ventilation for black tank 191.

Additionally, in one or more preferred embodiments, black tank 191 may include one or more sensors for measuring and/or computing one or more properties or parameters of black tank 191. The sensors may include, but are not limited to, weight sensors, pressure sensors, flow sensors, liquid level sensors, temperature sensors, chemical sensors, and/or any other sensors suitable for use in black tank 191. In one or more embodiments, the method 200 and/or the system 100 or the like may measure a liquid of the black tank during a cleaning or purging process using grey water sourced from a grey tank. In such embodiments, the method 200 may function to determine, during a pumping of greywater from the grey tank, the fluid level of the black tank and automatically cease or stop a pumping of greywater into the black tank if, via one or more sensors of the black tank, it is determined that the black tank is full or that the black tank is has been emptied.

1.92 Freshwater Tank

The freshwater tank 192 preferably functions to receive, store, and supply freshwater in the AEP trailer. In some preferred embodiments, freshwater tank 192 may function to receive and store freshwater from one or more external sources of freshwater. Additionally, or alternatively, in some preferred embodiments, freshwater tank 192 may function to supply one or more users of AEP trailer system 100 and/or water and waste management subsystem 190 with freshwater (e.g., via a sink, shower, or toilet). In some embodiments, freshwater tank 192 may function to provide a source of flushing water to one or more waste tanks of water and waste management subsystem 190 (e.g., black tank 191). In some embodiments, water and waste management subsystem 190 may include a plurality of freshwater tanks 192.

Freshwater tank 192 preferably includes one or more of: a freshwater inlet that may receive a flow of freshwater from an upstream supply of freshwater into freshwater tank 192, a freshwater outlet that may provide a flow of freshwater to one or more downstream components of water and waste management subsystem 190, a drainage outlet that may allow a drainage flow out of freshwater tank 192, a heater that may function to heat freshwater tank 192, a ventilation outlet or ventilation pipe for providing ventilation for freshwater tank 192.

Additionally, in one or more preferred embodiments, freshwater tank 192 may include one or more sensors for measuring and/or computing one or more properties or parameters of freshwater tank 192. The sensors may include, but are not limited to, weight sensors, pressure sensors, flow sensors, liquid level sensors, temperature sensors, chemical sensors, and/or any other sensors suitable for use in freshwater tank 192.

1.93 Treatment Subsystem

The treatment subsystem 193 preferably functions to store and supply treatment chemicals in water and waste management subsystem 190. In one or more preferred embodiments, treatment subsystem 193 may function to provide treatment chemicals to one or more waste tanks of waste management subsystem 190.

Treatment subsystem 193 preferably includes one or more of: a treatment tank that may store a volume or supply of treatment chemicals, one or more treatment chemical pumps arranged in a fluid pathway between the treatment tank and one or more waste tanks that may function to pump treatment chemicals out of the treatment tank to the one or more waste tanks, and one or more treatment valves that may be arranged in a fluid pathway between the treatment tank and the one or more waste tanks that may function to control a flow of treatment chemicals between the treatment tank and the one or more waste tanks.

In some embodiments, treatment subsystem 193 may be fluidly coupled to freshwater tank 192 by one or more fluid pathways that may function to provide treatment subsystem 193 with a supply of freshwater. In some such embodiments, water and waste management subsystem 190 may include one or more treatment pumps and/or treatment valves, which may be arranged in a fluid path downstream of treatment subsystem 193 and upstream of black tank 191. In such embodiments, the one or more treatment pumps and/or treatment valves may function to control a flow of treatment chemicals and/or treatment solution from treatment subsystem 193 to black tank 191.

Additionally, in one or more preferred embodiments, treatment subsystem 193 may include one or more sensors for measuring and/or computing one or more properties or parameters of treatment subsystem 193. The sensors may include, but are not limited to, weight sensors, pressure sensors, flow sensors, liquid level sensors, temperature sensors, chemical sensors, and/or any other sensors suitable for use in treatment subsystem 193.

1.94 Sewage Outlet

The sewage outlet 194 preferably functions to provide an outlet for waste and/or wastewater in water and waste management subsystem 190. In one or more preferred embodiments, sewage outlet 194 may function to mechanically and fluidly connect to an external dump site for draining, dumping, and/or flushing waste and wastewater out from water and waste management subsystem 190 to the external dump site. In some embodiments, water and waste management subsystem 190 may include a macerator pump (or similar waste pump) upstream of sewage outlet 194 for facilitating waste draining and dumping. Additionally, in some embodiments, sewage outlet 194 may function to connect to a waste hose coil such that the waste hose coil may provide a pathway or passage between sewage outlet 194 and the external dump site.

1.95 Waste Valve

The waste valve 195 preferably functions to control a flow of waste between black tank 191 and sewage outlet 194. In one or more preferred embodiments, waste valve 195 may be an automatic control valve (e.g., an electric ball valve, a motorized valve, or other automatically controllable valve) arranged in a waste flow passage or pathway between black tank 191 and sewage outlet 194. Preferably, water and waste management subsystem 190 may function to open waste valve 195 when dumping, draining, and/or flushing black tank 191 such that waste and/or wastewater may flow out from black tank 191, through sewage outlet 194, to an external dump site.

1.96 Flushing Valve

The flushing valve 196 preferably functions to control a flow of flushing water into black tank 191. In one or more preferred embodiments, flushing valve 196 may be an automatic control valve (e.g., an electric ball valve, a motorized valve, or other automatically controllable valve) arranged in a flushing flow passage or pathway between freshwater tank 192 and black tank 191. Preferably, water and waste management subsystem 190 may function to open flushing valve 196 when flushing black tank 191 with freshwater such that water may flow from freshwater tank 192 into black tank 191. In such preferred embodiments, the flow of flushing water may be a flow of freshwater. In some embodiments, one or more valves and/or pumps may be arranged in the fluid pathway between freshwater tank 192 and black tank 191. In some embodiments, a toilet or other component of waste management system 190 may be arranged in a fluid pathway between freshwater tank 192 and black tank 191 (as shown by way of example in FIGS. 1B-1C).

Additionally, or alternatively, in some embodiments, water and waste management subsystem 190 may function to receive a supply of freshwater and/or flushing water from an external water source. In some such embodiments, flushing valve 196 may be arranged in a fluid pathway between the external water source and black tank 191, and flushing valve 196 may function to control a flow of flushing water from the external water source into black tank 191. Additionally, or alternatively, in one or more embodiments, a dedicated flushing valve (not shown) may be arranged in the fluid pathway between the external water source and black tank 191, such that the dedicated flushing valve may control the flow of flushing water from the external water source into black tank 191. It shall be noted that in various embodiments water and waste management subsystem 190 may be capable of receiving freshwater from a plurality of water sources including, but not limited to, freshwater tank 192 and an external water source. In such embodiments, the dedicated flushing valve may be arranged in parallel to flushing valve 196, such that flushing valve 196 may function to control a flow of freshwater from freshwater tank 192 into black tank 191, and the dedicated flushing valve may control the flow of flushing water from the external water source into black tank 191.

1.97 Grey Tank

The grey tank 197 (sometimes referred to herein as a greywater tank) preferably functions to receive and store wastewater (greywater) from one or more sources of greywater including, but not limited to, one or more sinks and/or one or more showers of the water and waste management subsystem 190.

Grey tank 197 preferably includes one or more of: one or more greywater inlets that may allow greywater wastewater into grey tank 197, a greywater waste outlet that may allow a flow of greywater out of grey tank 197 to sewage outlet 194, a greywater flushing outlet that may allow a flow of greywater out of grey tank 197 to black tank 191, and a ventilation outlet or ventilation pipe for providing ventilation for grey tank 197.

Additionally, in one or more preferred embodiments, grey tank 197 may include one or more sensors for measuring and/or computing one or more properties or parameters of grey tank 197. The sensors may include, but are not limited to, weight sensors, pressure sensors, flow sensors, liquid level sensors, temperature sensors, chemical sensors, and/or any other sensors suitable for use in grey tank 197.

1.98 Greywater Waste Valve

The greywater waste valve 198 preferably functions to control a flow of greywater between grey tank 197 and sewage outlet 194. In one or more preferred embodiments, greywater waste valve 198 may be an automatic control valve (e.g., an electric ball valve, a motorized valve, or other automatically controllable valve) arranged in a waste flow passage or pathway between grey tank 197 and sewage outlet 194. Preferably, water and waste management subsystem 190 may function to open greywater waste valve 198 when dumping, draining, and/or flushing grey tank 197 such that greywater wastewater may flow out from grey tank 197, through sewage outlet 194, to an external dump site. In some embodiments, a pump may be arranged in a fluid pathway downstream of greywater waste valve 198 and waste valve 195 and upstream of sewage outlet 194 to force greywater and waste out through sewage outlet 194 during draining, purging, or flushing of black tank 191 and/or grey tank 197.

1.99 Greywater Flushing Valve

The greywater flushing valve 199 preferably functions to control a flow of greywater flushing water into black tank 191. In one or more preferred embodiments, greywater flushing valve 199 may be an automatic control valve (e.g., an electric ball valve, a motorized valve, or other automatically controllable valve) arranged in a flushing flow passage or pathway between grey tank 197 and black tank 191. Preferably, water and waste management subsystem 190 may function to open greywater flushing valve 199 when flushing black tank 191 with greywater such that water may flow from grey tank 197 into black tank 191. In such preferred embodiments, the flow of flushing water may be a flow of greywater. In some embodiments, one or more valves and/or pumps may be arranged in the fluid pathway between grey tank 197 and black tank 191.

2. Method for Managing and Controlling Waste and Wastewater in an Autonomous Electric Powered Trailer As shown in FIG. 2, a method 200 for managing and controlling waste and wastewater in an autonomous electric powered trailer includes configuring a waste management system for waste disposal S210, initiating a draining of the black tank S215, draining the black tank S220, flushing the black tank S230, treating the black tank S240, and disconnecting the waste management system S260. Additionally, in some embodiments, method 200 may optionally include draining the grey tank S250. It shall be noted that, while in some embodiments method 200 be implemented in the autonomous electric powered trailer, method 200 may be implemented in any suitable trailer, recreational vehicle, and/or other vehicle or structure for the purpose of storing, managing, and controlling freshwater, waste, and wastewater.

2.10 Configuring a Waste Management System for Waste Disposal

S210, which includes configuring a waste management system for waste disposal, may function to configure and/or initialize the waste management system of the AEP trailer for a waste disposal and cleaning workflow to allow for disposal of waste and/or wastewater and/or to allow for cleaning of one or more components of the waste management system. A waste disposal and cleaning workflow, as generally referred to herein, may relate to one or more distinct waste disposal and cleaning processes such as waste tank draining, waste tank flushing, waste tank treatment, and/or the like. Preferably, S210 may include coupling a sewage outlet of the waste management system to an external dump site to establish a waste dumping or draining connection between the waste management system and the external dump site.

Coupling the Sewage Outlet to an External Dump Site

Preferably, S210 may include mechanically and fluidly coupling the sewage outlet to an external dump site. As generally referred to herein, an external dump site may relate to any suitable external container, tank, vessel, receptacle and/or the like, and/or any waste station or dump station suitable for receiving waste. In some embodiments, S210 may include coupling a waste hose coil to the sewage outlet and to the inlet of the external dump site, such that the waste hose coil may function as a waste passage between the sewage outlet and the external dump site. Additionally, in one or more embodiments, S210 may additionally include closing and/or ensuring that a waste valve is closed before coupling the sewage outlet to the external dump site.

In some embodiments, S210 may additionally function to automatically close the waste valve and/or to automatically ensure that the waste valve is closed. The waste valve, as used herein, may refer to an automatic control valve (e.g., a motorized valve, electric ball valve, or other automatically controllable valve) that may be arranged in a waste outlet flow path downstream of the black tank and upstream of the sewage outlet and may function to open or close a waste passage between the black tank and the sewage outlet. As such, the waste valve may control a flow of waste out from the black tank to the sewage outlet. Preferably, the waste valve may be closed (i.e., in a closed state) before the coupling of the sewage outlet to the external dump site.

Waste Management System Monitoring and User Notification

In some embodiments, S210 may additionally function to monitor one or more parameters of the waste management system using one or more sensors. In such embodiments, S210 may function to use the one or more sensors to monitor parameters including, but not limited to, a connection status of the sewage outlet of the waste management system (e.g., connected or disconnected), a measurement of waste contained in the waste management system (e.g., waste volume, waste mass, waste level, and/or the like), a measurement of freshwater available in and/or to the waste management system (e.g., freshwater volume, freshwater mass, freshwater level, and/or the like), a measurement of treatment chemicals available in and/or to the waste management system (e.g., treatment chemical volume, treatment chemical mass, treatment chemical level, and/or the like), a status of one or more valves of the waste management system (e.g., open or closed), a status of one or more pumps of the waste management system (e.g., pump voltage, pump current, pump speed, pump flow rate, pump on/off status, and/or the like), and/or any other property, value, or parameter of the waste management system suitable to be monitored.

In some embodiments, a waste management control system may function to monitor the one or more parameters of the waste management system. In various embodiments, the waste management control system may include one or more local and/or remote computing systems (e.g., one or more computers, one or more remote servers, one or more cloud servers, and/or the like), one or more electronic communication systems, modules, and/or devices (e.g., wireless communication modules, wired communication modules, and/or the like), one or more control units and/or controllers, and/or any other suitable computing devices, control devices, and/or combinations thereof. In some embodiments, the waste management control system may function to continuously monitor the one or more parameters of the waste management system based on sensor signals received from the one or more sensors of the waste management system.

In some embodiments, the waste management control system may function to continuously monitor waste and water levels in one or more (or all) tanks of the waste management system and/or the AEP trailer to detect overfill and/or backflow conditions. For example, the waste management control system may detect if one of the tanks of the AEP trailer (e.g., the grey water tank, the black tank, the freshwater tank, and/or the like) has reached or exceeded a maximum fill threshold. As referred to herein, a maximum fill threshold for a corresponding tank may relate to an amount of fluid or waste (e.g., a fluid or waste level) above which the corresponding tank may be in danger of overflowing or causing backflow in the waste management system. In some such embodiments, the waste management control system may function to prevent overfilling and/or backflow by automatically closing one or more tank inlet or outlet valves, and/or deactivating one or more pumps, that may induce or permit flow into or out of any tanks determined to have reached or exceeded a maximum fill threshold.

In some such embodiments, S210 may function to determine if the waste management system is ready to initiate or execute a draining and/or flushing of one or more tanks of the waste management system based on one of the one or more monitored parameters or a combination thereof. As a non-limiting example, the waste management system (e.g., the waste management control system) may determine a "ready" state based on one or more of: detecting that the sewage outlet is coupled to an external dump site, identifying that a volume of freshwater in a freshwater tank is above a predetermined volume, and identifying that a volume of treatment chemicals in a treatment tank is above a predetermined volume. It shall be noted that S210 may function to determine a "ready" state using other parameters or combinations of parameters than those described in the preceding example. In some embodiments, S210 may function to automatically notify or prompt one or more users via one or more user devices and/or a user interface (e.g., the waste management user interface, described below) when the waste management system is in a ready state.

2.15 Initiating a Draining of the Black (Water) Tank

S215, which includes initiating a draining of the black tank, may function to initiate a draining operation for draining or purging waste and wastewater from the black tank based on the coupling status of the sewage outlet. Preferably, S215 may function to initiate the draining of the black tank after the coupling of the sewage outlet to the external dump station inlet. Furthermore, in some preferred embodiments, S215 may function to initiate the draining of the black tank based on determining (e.g., via the waste management control system) a "ready" state of the waste management system (as described in 2.1).

In a first implementation, S215 may include receiving user input for initiating the draining and/or flushing of the black tank and/or receiving an initiating signal from a user-controlled device (e.g., a mobile phone, tablet, laptop, etc.) for initiating the draining and/or flushing of the black tank. In some embodiments, S215 may implement a waste management user interface (e.g., a graphical user interface, a voice user interface, and/or the like) for receiving user input and providing output to the user for configuring, monitoring, and/or initiating one or more waste management processes. In such embodiments, the user may initiate the draining of the black tank via the user interface. Additionally, or alternatively, in such embodiments, the one or more monitored parameters of the waste management system may be output or provided to one or more users via the user interface and/or the user-controlled device. In some embodiments, S215 may function to direct the user input and/or the initiating signal to the waste management control system, which in turn may function to initiate a draining, purging, and/or cleaning of one or more waste tanks of the waste management system based on the user input and/or the initiating signal. In one or more embodiments, the waste management user interface may enable one or more users to continually monitor any or all processes executed by the waste management system, and/or any or all parameters of the waste management system. Additionally, or alternatively, the waste management user interface may enable one or more users to abort any or all steps of method 200 in real time and/or halt any process executed by the waste management system.

Additionally, or alternatively, in a second implementation, S215 may function to automatically initiate a draining of the black tank based on one or more automatic initiation parameters which may include, but are not limited to, a connection status of the sewage outlet of the waste management system (e.g., connected or disconnected), a measurement of waste contained in the waste management system (e.g., waste volume, waste mass, waste level, and/or the like), a measurement of freshwater available in and/or to the waste management system (e.g., freshwater volume, freshwater mass, freshwater level, and/or the like), a measurement of treatment chemicals available in and/or to the waste management system (e.g., treatment chemical volume, treatment chemical mass, treatment chemical level, and/or the like), a status of one or more valves of the waste management system (e.g., open or closed), a status of one or more pumps of the waste management system (e.g., pump voltage, pump current, pump speed, pump flow rate, pump on or off, and/or the like), a timer value (e.g., a timer counting down from a predetermined value, or a timer counting up from a particular start time), and/or the like. In such embodiments, the waste management system may include one or more sensors for measuring the one or more automatic initiation parameters. In some embodiments, the waste management control system may function to continuously monitor the one or more automatic initiation parameters. Additionally, or alternatively, in some embodiments S215 may function to generate an initiation signal for the waste management control system to initiate a cleaning, draining, and/or purging of one or more waste tanks of the waste management system if one or more of the one or more automatic initiation parameters reaches or exceeds an automatic initiation threshold value. In various embodiments, an automatic initiation threshold value may refer to a value for a corresponding automatic initiation parameter that, when reached (or exceeded or crossed), may indicate that the waste management system may automatically initiate a draining, purging, and/or cleaning of one or more waste tanks. It shall be noted that such an implementation may not preclude one or more users from configuring, monitoring, and initiating one or more waste management processes via the waste management user interface.

Additionally, or alternatively, in a third implementation, S215 may function to both receive user input for initiating the draining of the black tank and/or receive an initiating signal from a user-controlled device, as well as automatically initiating a draining of the black tank based on one or more automatic initiation parameters. In such embodiments, S215 (e.g., via the waste management control system) may function to initiate the draining of the black tank when receiving a user input or signal, and/or when the automatic initiation parameters are satisfied. That is, in some embodiments, S215 (e.g., via the waste management control system) may function to require only one of user input or satisfied automatic initiation parameters, or alternatively both user input and satisfied automatic initiation parameters.

2.20 Draining the Black Tank

Figure 7:
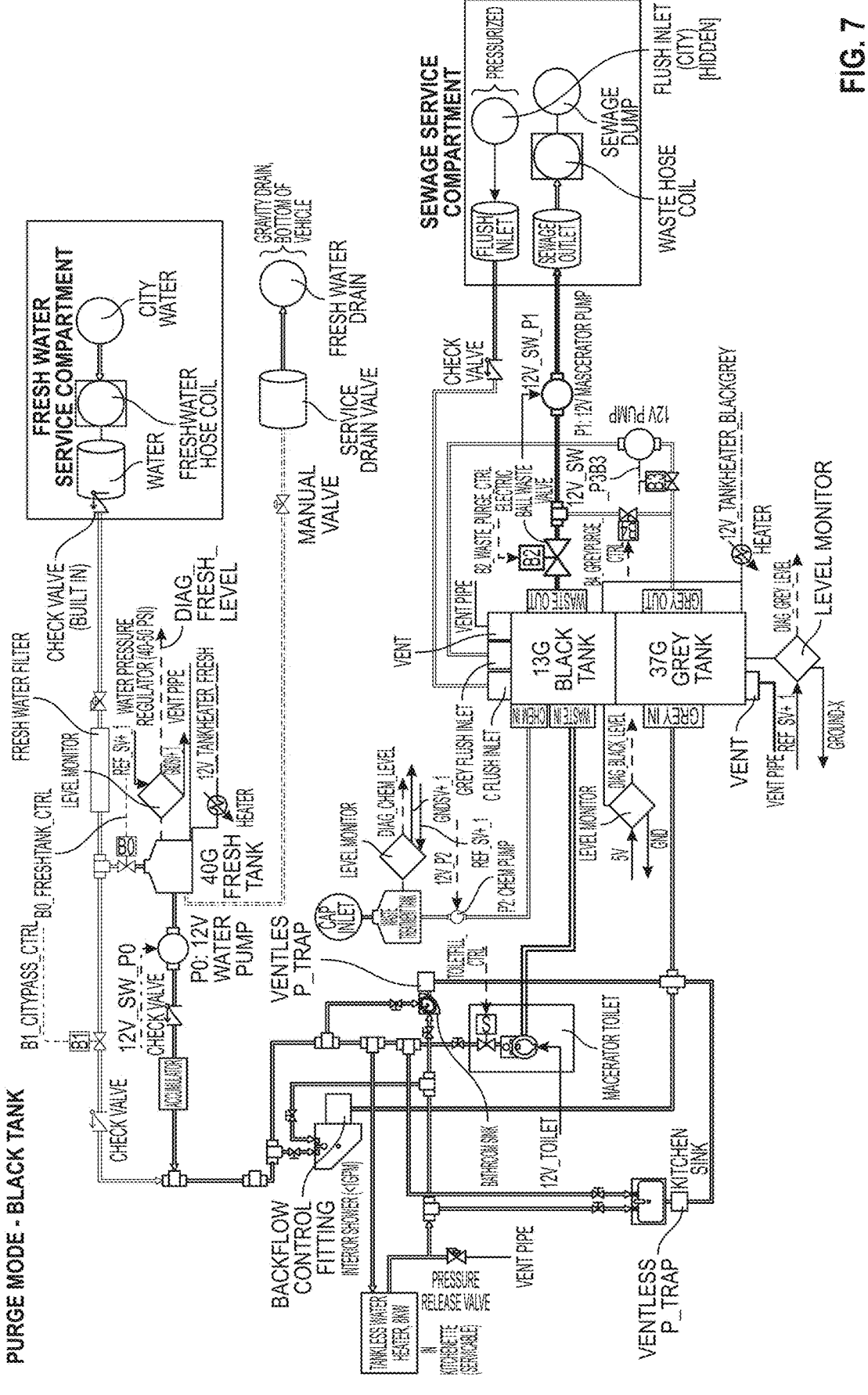
FIG. 7 illustrates an example schematic of a water and waste management subsystem in a black tank purging mode in accordance with one or more embodiments of the present application.

S220, which includes draining the black tank, may function to drain or dump waste and/or wastewater from the black tank based on an initiating of the draining process, as shown by way of example in FIG. 7 (open/operating fluid pathways during black tank draining/purging shown in bold in FIG. 7). Preferably, S220 may include automatically opening the waste valve to allow waste and/or wastewater to flow out of a waste outlet of the black tank. In some preferred embodiments, S220 may include continually monitoring one or more draining completion parameters for determining a completion of the draining process. As used herein, a draining completion parameter may be a computed or measured value of the waste management system (such as waste level, draining time, etc.) that may function as an indicator that the draining process may be complete. Additionally, in some embodiments, upon determining a completion of the draining process S220 may further function to initiate a flushing of the black tank.

Preferably, S220 may include draining waste and/or wastewater from the black tank. In some preferred embodiments, S220 may function to automatically open a waste valve to permit a draining of waste and/or wastewater from the outlet of the black tank to the external dump site. In one or more embodiments, the waste management control system may, after the initiation of the draining of the black tank, automatically open the waste valve (e.g., by transmitting an opening control signal to the waste valve). In some embodiments, the draining may be driven or assisted by gravity, such that waste and wastewater fall through the outlet of the black tank, through a waste passage between the outlet of the black tank and the sewage outlet, and out of the sewage outlet. Additionally, or alternatively, in some embodiments, a waste pump may be arranged in the waste passage. In such embodiments, the waste pump may be automatically activated or operated (e.g., by a pump control signal transmitted by the waste management control system) to induce or assist the draining of the waste and wastewater from the black tank. In one or more embodiments, the waste pump may comprise a macerator pump.

Determining a Completion of the Black Tank Draining Process

Preferably, S220 may function to determine a completion of the draining of the black tank based on the one or more monitored draining completion parameters, which may include, but are not limited to, an amount (e.g., weight, volume, height, or the like) of waste and/or wastewater remaining in the black tank, an amount of waste and/or wastewater drained from the black tank, a duration (e.g. a timer) of the draining process of the black tank (i.e., an amount of time since the start of the draining of the black tank), and/or any other suitable parameter or combination thereof for determining a completion of the draining of the black tank. In some preferred embodiments, one or more sensors (e.g., weight sensors, level sensors, or the like) may be used to measure and/or compute one or more draining completion parameters. In some embodiments, the one or more sensors may output sensor data and/or sensor signals to the waste management control system. Preferably, S220 may function to determine a completion of the draining process once each of the one or more draining completion parameters reaches (or exceeds or crosses) a corresponding predetermined draining completion threshold value. In various embodiments, a draining completion threshold value may relate to a value for a corresponding draining completion parameter that, when reached (or exceeded or crossed), may indicate that the draining process is complete. In some embodiments, the one or more draining completion parameters and/or the one or more draining completion threshold values may be selected or set by a user (e.g., via the waste management user interface).

In a first implementation, upon determining a completion of the draining of the black tank, S220 may function to automatically initiate a flushing of the black tank. In a second implementation, S220 may function to notify the user (e.g., via a user-controlled device and/or the waste management user interface) that the black tank has been drained upon completion of the draining process. In some such embodiments, S220 may function to query or prompt the user as to whether to initiate a flushing of the black tank. In such embodiments, the user may select an option to initiate a flushing of the black tank, and/or the user may select an option to skip the flushing of the black tank. In a third implementation, S220 may function to combine user input and automatic determination to initiate a treatment of the black tank. Additionally, or alternatively, via S220 a purging and/or wastewater cleaning cycle may be automatically scheduled or programmed. In such embodiments, pre-programming or scheduling the flushing of the black tank, may automatically initialize and execute the cleaning and/or flushing of the black tank without further user input. That is, in such embodiments, either sensor input identifying a state of the black tank and/or the scheduled period or dates/times for automatically cleaning the black tank may trigger or cause an automatic execution of the purging and/or cleaning of the black tank.

Additionally, or alternatively, in some embodiments S220 may function to initiate a flushing of the black tank based on one or more automatic initiation parameters (as described in 2.15). As a non-limiting example, a completion of the draining of the black tank may be identified based on a level sensor measurement of a level of waste in the black tank that may be below a predetermined draining completion threshold level of waste. In such embodiments, the level sensor may transmit a zero-fill signal to the waste management control system that may indicate the level of waste in the black tank is below the draining completion threshold. In turn, a flushing of the black tank may then be initiated based on a further evaluation of a sensor measurement of a level of flushing water (e.g., the level of freshwater in a freshwater tank, greywater in a greywater tank, and/or any other source of flushing water) such that a flushing may be initiated if the level of flushing water available may be greater than a minimum threshold level sufficient to flush the black tank.

It shall be noted that the preceding example is non-limiting, and S220 may function to evaluate or monitor any combination of one or more suitable automatic initiation parameters to initiate a flushing of the black tank. As a non-limiting example, S220 may function to measure a liquid of the black tank during a cleaning or purging process using grey water sourced from a grey tank. In such embodiments, the method 200 may function to determine, during a pumping of greywater from the grey tank, the fluid level of the black tank and automatically cease or stop a pumping of greywater into the black tank if, via one or more sensors of the black tank, it is determined that the black tank is full or that the black tank is has been emptied. Accordingly, in one or more embodiments, a regulation of the flow of grey water from the grey tank may be managed based on a reading of the one or more sensors of the black tank that identify a level of fluid therein.

2.30 Flushing the Black Tank

Figure 3:
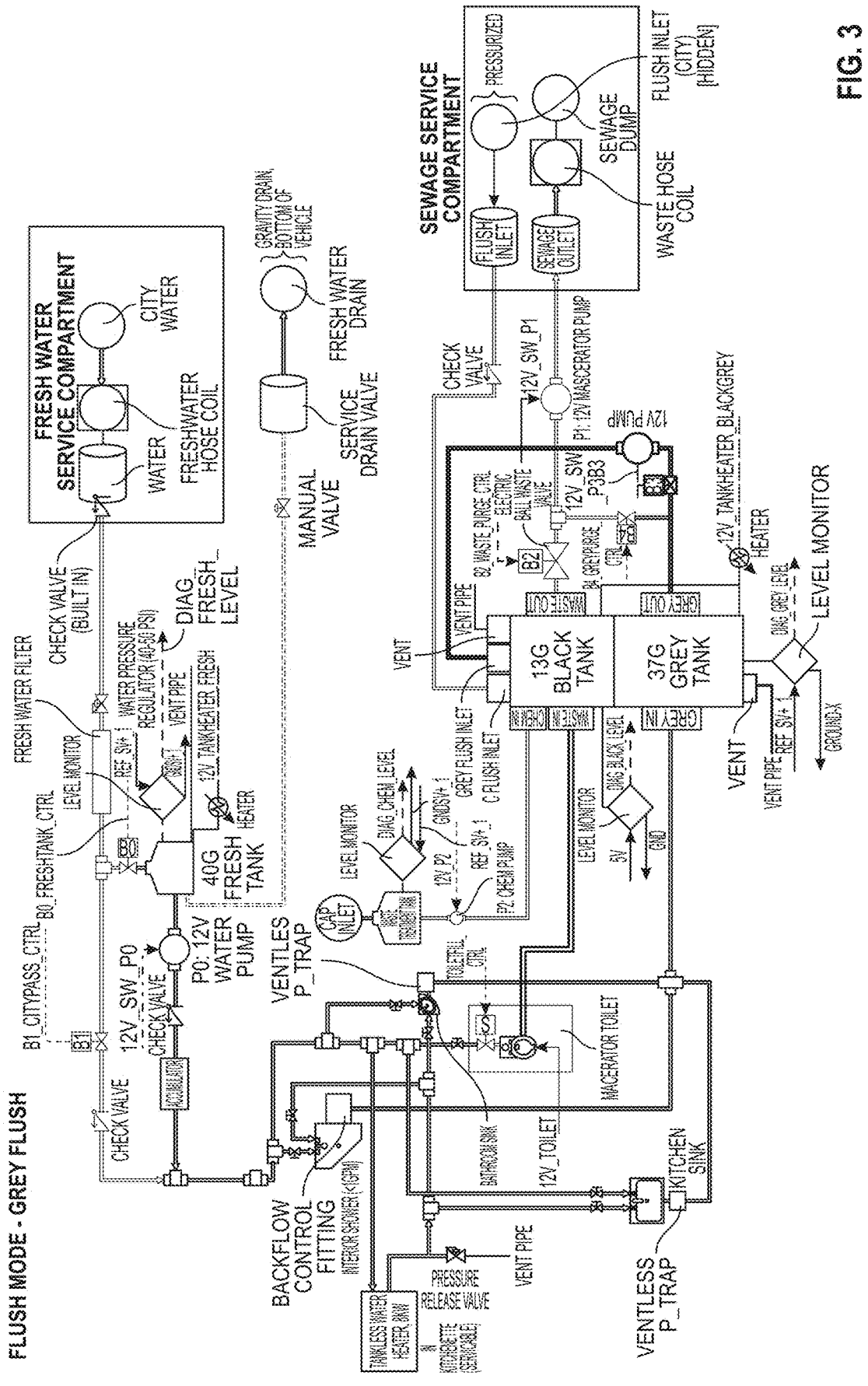
FIG. 3 illustrates an example schematic of a water and waste management subsystem in a greywater flush mode in accordance with one or more embodiments of the present application.
Figure 4:
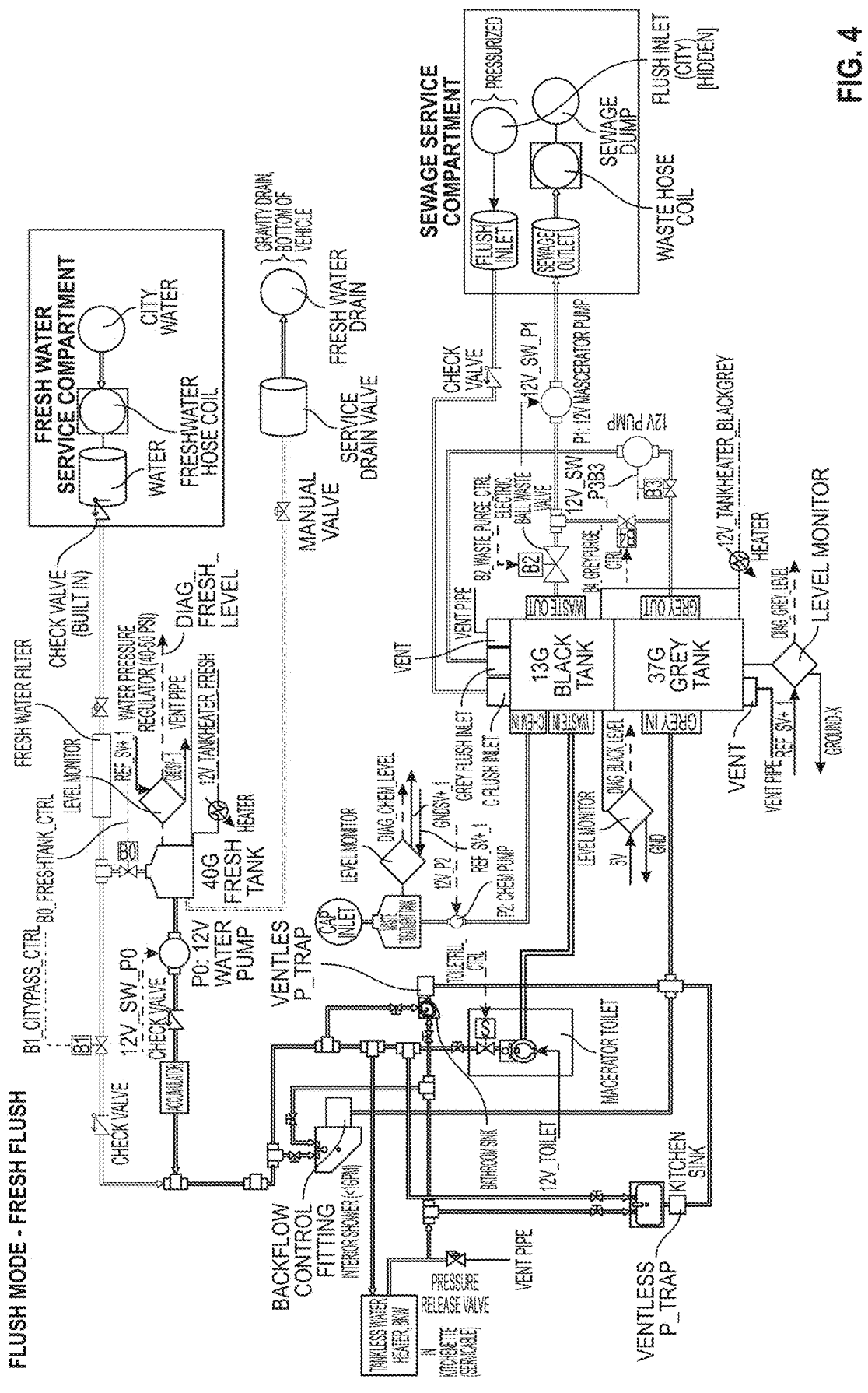
FIG. 4 illustrates an example schematic of a water and waste management subsystem in a freshwater flush mode in accordance with one or more embodiments of the present application.
Figure 5:
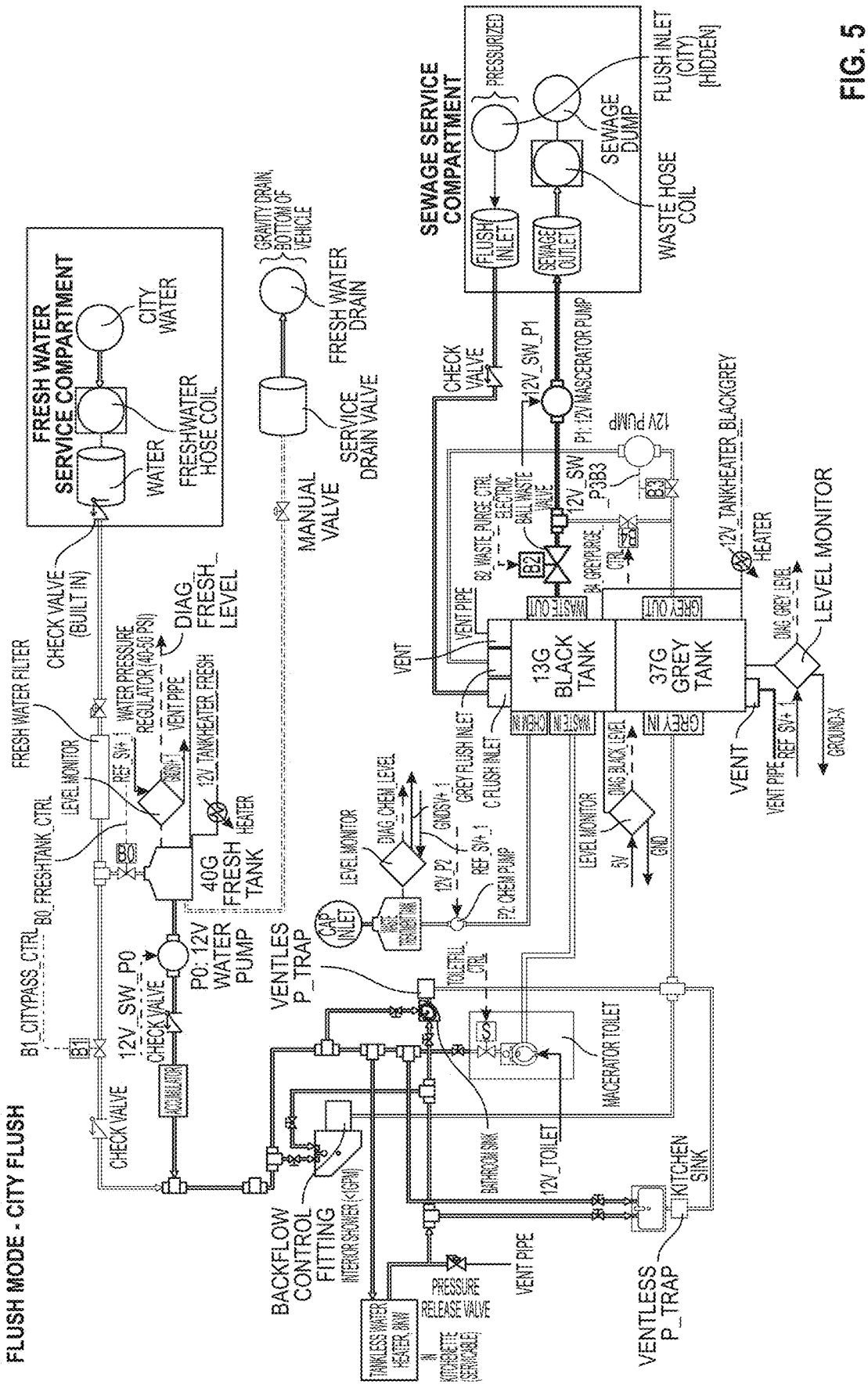
FIG. 5 illustrates an example schematic of a water and waste management subsystem in an external (city) flush mode in accordance with one or more embodiments of the present application.

S230, which includes flushing the black tank, may function to flush an interior of the black tank with a flow of water for removing remaining waste or wastewater from the black tank and/or for cleaning the interior of the black tank based on an initiating of the flushing of the blank tank, as shown by way of example in FIGS. 3-5 (open/operating fluid pathways shown in bold in FIGS. 3-5). Preferably, the flushing of the black tank may include automatically opening a flushing valve that may allow a flow of freshwater and/or other suitable flushing water into the black tank. In various embodiments, as described below, the flushing water may be sourced directly or indirectly from a greywater tank, a freshwater tank, an external water source, and/or any other suitable water source. It shall be noted that references to flushing water herein may include greywater, freshwater, and/or externally sourced water based on the flushing processes described below. In some preferred embodiments, S230 may include initializing and/or monitoring one or more flushing completion parameters, such as a timer, a waste volume, a flushing water volume, or the like. As used herein, a flushing completion parameter may be a computed or measured value of the waste management system (such as waste level, draining time, etc.) that may function as an indicator that the flushing process may be complete. In such preferred embodiments, S230 may function to automatically close the waste valve based on determining or identifying a completion of the flushing process.

Preferably, S230 may include flushing the interior of the black tank with a flow of water. In one or more preferred embodiments, S230 may function to automatically open a flushing valve to permit a flow of water into a flushing inlet of the black tank. The flushing valve, as used herein, may refer to an automatic control valve (e.g., an electric ball valve, a motorized valve, or other automatically controllable valve) that may be arranged or located in a fluid pathway upstream of a flushing inlet of the black tank and downstream of a source of flushing water, such that the flushing valve may control flow through a flushing fluid pathway to the black tank. In some such preferred embodiments, the flushing inlet may include a spray or spray inlet. Preferably, during the flushing of the black tank, water may be sprayed or otherwise guided into the black tank to flush and/or rinse remaining waste and/or wastewater out of the waste outlet of the black tank, through the waste passage to the sewage outlet, and out to the external dump site.

In some embodiments, S230 may function to automatically close the waste outlet valve in response to initiating a flushing of the black tank before automatically opening the flushing valve to allow a volume of flushing water to accumulate inside the black tank. In such embodiments, when the level of flushing water in the black tank reaches (or exceeds) a flushing water threshold, S230 may function to automatically open the waste outlet valve to direct the accumulated flushing water and any remaining waste out of the waste outlet of the black tank, through the waste outlet flow path of the waste management system, and out of the sewage outlet of the black tank. In some such embodiments, S230 may additionally function to activate or operate the waste outlet pump to pump the accumulated flushing water and any remaining waste through the waste outlet flow path. In various embodiments, the automatic opening and closing of the waste outlet valve and the automatic activation of the waste outlet pump may be controlled and/or otherwise managed by the waste management control system.

Additionally, or alternatively, in some embodiments, S230 may function to keep the waste outlet valve open while flushing the black tank. In such embodiments, flushing water and any remaining waste in the black tank moved by the flushing water may continuously exit the black tank via the waste outlet, through the waste outlet flow path, and out through the sewage outlet. In such embodiments, S230 may additionally function to activate or operate the waste outlet pump to pump the flushing water and remaining waste out through the waste outlet flow path.

Flushing Processes

In a first implementation, the flow of flushing water may comprise a flow of freshwater. In such preferred embodiments, the flow of freshwater may be from one or more freshwater tanks. In such an implementation, the flushing valve may comprise a freshwater flushing valve located downstream of the freshwater tank, such that the flushing valve may permit a flow of freshwater from the freshwater tank to the flushing inlet of the black tank. Such an implementation may advantageously reduce the number and/or complexity of external fluid connections by not requiring an external source of flushing water. In some embodiments, S230 may only function to execute a freshwater flush based on determining that the amount of water in the freshwater tank is above a freshwater flushing threshold. In one or more embodiments, the freshwater flushing threshold may comprise a minimum water level or minimum water volume value that may indicate the minimum level or volume of freshwater required to continue execution of a freshwater flushing. In some embodiments, once a freshwater flushing has been completed, the freshwater flushing valve may be automatically closed (e.g., by a control signal from the waste management control system) to stop a flow of freshwater into the black tank.

In a second implementation, in embodiments including a distinct grey tank separate from a distinct black tank, the flow of flushing water may comprise a flow of greywater from the grey tank, as shown by way of example in FIG. 3. Such an implementation may advantageously reduce the number and/or complexity of external fluid connections by not requiring an external source of flushing water, and additionally may conserve freshwater. In such an implementation, a greywater flushing valve may be located in a greywater flushing flow path downstream of the grey tank and upstream of the black tank, such that the greywater flushing valve may permit a flow of greywater from the grey tank to the flushing inlet of the black tank. In some such embodiments, the flushing inlet of the black tank may include or comprise a greywater flushing inlet that may function to permit the flow of greywater into the black tank. Additionally, or alternatively, in some embodiments, a greywater flushing pump may be arranged in the greywater flushing flow path upstream of the black tank and downstream of the grey tank and the greywater flushing valve. In such embodiments, the greywater flushing pump may function to pump a flow of greywater as flushing water through the greywater flushing flow path into the black tank. In some embodiments, S230 may only function to execute a greywater flush based on determining that the amount of water in the greywater tank is above a greywater flushing threshold. In one or more embodiments, the greywater flushing threshold may comprise a minimum greywater level or minimum greywater volume value that may indicate the minimum level or volume of greywater required to continue execution of a greywater flushing. In some embodiments, once a greywater flushing has been completed, the greywater flushing valve may be automatically closed (e.g., by a control signal from the waste management control system) to stop a flow of greywater into the black tank As a non-limiting example of the second implementation, in response to the initiation of the flushing of the black tank, the waste management control system may function to electronically transmit an opening signal to the waste outlet valve of the black tank (if the waste outlet valve is closed) to automatically open the waste outlet valve of the black tank, which may ensure that the waste outlet flow path from the black tank to the sewage outlet is open. In turn, the waste management control system may function to transmit an opening signal to the greywater flushing valve, and in turn the waste management control system may function to transmit a start or run signal to the greywater flushing pump to drive a flow of greywater as flushing water through the greywater flushing flow path into an interior of the black tank (via a flushing inlet in the black tank). In such an example, the flow of greywater may collect remaining waste material in the black tank and carry the waste material out of the black tank, through the waste outlet flow path and out through the sewage outlet.

In a third implementation, the flow of flushing water may be a flow of freshwater sourced indirectly from the freshwater tank through a toilet of the AEP trailer (indirect freshwater flush), as shown by way of example in FIG. 4. Such an implementation may advantageously reduce the number and/or complexity of external fluid connections by not requiring an external source of flushing water. In addition, such an implementation may advantageously provide an "air gap" between the freshwater tank(s) and the black tank that may function to maintain sanitary isolation of the freshwater tank(s). In such an implementation, a toilet flushing valve may be located upstream of the toilet between the freshwater tank and the toilet, such that the flushing valve may permit a flow of freshwater into the toilet. In such an implementation, the flow of flushing water may then be directed from the toilet through a waste inlet flow path to the waste inlet of the black tank. In some such embodiments, the toilet flushing valve may be automatically opened by the waste management control system (e.g., based on a transmitted control signal from the waste management control system) in response to the initiation of an indirect freshwater flushing of the black tank. Additionally, or alternatively, in embodiments wherein the toilet comprises a pump (e.g., a macerator toilet pump), the waste management control system may function to automatically start or run the toilet pump (e.g., based on transmitting a start or run control signal) to drive the flow of freshwater out of the toilet to the black tank via the waste inlet flow path. In some embodiments, S230 may only function to execute an indirect freshwater flush based on determining that the amount of water in the freshwater tank is above a freshwater flushing threshold. In some embodiments, once an indirect freshwater flushing has been completed, the toilet flushing valve may be automatically closed (e.g., by a control signal from the waste management control system) to stop a flow of freshwater into the black tank In a fourth implementation, the flow of flushing water may be a flow of water from an external water source, as shown by way of example in FIG. 5. In such an implementation, the waste management system may include an external flushing inlet that may be mechanically and fluidly coupled to an external water source (e.g., a city water source). In such embodiments, a flushing valve may be arranged in a fluid pathway between the external flushing inlet and the flushing inlet of the black tank, such that the flushing valve may control a flow of water from the external water source into the black tank. In some such embodiments, the waste management control system may function to automatically open the flushing valve to allow a flow of flushing water from the external water source into the black tank.

It shall be noted that the above flushing implementations may be executed individually, or alternatively the above flushing implementations may be executed in any suitable combination. That is, in various embodiments, S230 may function to execute a flushing sequence of one or more flushing processes in any suitable combination. As a non-limiting example, in response to the initiation of a flushing of the black tank, S230 may function to automatically execute a greywater flushing of the black tank, and subsequently S230 may function to automatically execute an indirect freshwater flushing of the black tank. It shall be noted that S230 may function to execute any combination of one or more of the above-identified flushing implementations in any suitable sequence.

In some embodiments, S230 may function to execute a user-configured flushing sequence of one or more flushing processes (e.g., freshwater flush, greywater flush, indirect freshwater flush, and/or external flush processes). In such embodiments, one or more users may function to select (e.g., via a user device and/or the waste management user interface) the one or more flushing processes to be executed during the flushing of the black tank.

In some embodiments, if the amount of flushing water for a currently initiated flushing process (e.g., freshwater or greywater levels) is below the corresponding flushing threshold, S230 may function to abort the current flushing process, and in turn S230 may function to notify the user (e.g., via a user device and/or the waste management user interface) that there is insufficient flushing water (e.g., freshwater or greywater, depending on the current flushing process) to continue. In turn, S230 may prompt the user to select one or more alternative flushing processes (e.g., freshwater flushing, indirect freshwater flushing, greywater flushing and/or external water source flushing).

Additionally, or alternatively, in some embodiments, in response to determining that the amount of flushing water for a currently initiated flushing process (e.g., freshwater or greywater levels) is below the corresponding flushing threshold, S230 may function to automatically execute that flushing process in a suboptimal mode that may use reduced flushing water. In turn, S230 may function to automatically execute one or more subsequent alternate flushing processes in a compensating mode using increased flushing water, such that S230 may function to compensate for the suboptimal flushing process. In some embodiments, S230 may function to notify the user that only suboptimal flushing of the current flushing process may be performed, and one or more alternate flushing processes may be run in a compensating mode using increased flushing water. In some such embodiments, S230 may function to wait for user confirmation before continuing to execute the suboptimal and/or compensating flushing processes.

Determining a Completion of the Flushing Process

Preferably, S230 may function to determine a completion of the flushing of the black tank, or one or more distinct flushing processes of the flushing of the black tank, based on one or more monitored flushing completion parameters, which may include, but are not limited to, an amount (e.g., weight, volume, height, or the like) of flushing water used to flush the black tank (e.g., greywater, freshwater, and/or externally sourced water), an amount of waste and/or wastewater remaining in the black tank, an amount of waste and/or wastewater drained from the black tank, a duration of the flushing of the black tank (i.e., an amount of time since the start of the flushing of the black tank), and/or any other suitable parameter for determining a completion of the flushing of the black tank. Preferably, S230 may function to determine a completion of the flushing process once each of the one or more flushing completion parameters reaches (or exceeds and/or crosses) a corresponding predetermined flushing completion threshold value. In various embodiments, a flushing completion threshold value may relate to a value for a corresponding flushing completion parameter that, when reached (or exceeded and/or crossed), may indicate that the flushing process is complete. In some embodiments, the one or more flushing completion parameters may be selected by a user (e.g., via the waste management user interface). The one or more monitored flushing completion parameters may be measured, computed, or otherwise determined based on values from one or more sensors of the waste management system and/or the waste management control system. In some embodiments, once the one or more flushing completion parameters reach (or exceed and/or cross) corresponding flushing completion threshold values, a flushing completion signal may be generated (e.g., via one or more sensors and/or the waste management control system) that may indicate that the flushing process is complete.

In one or more embodiments, if flushing the black tank includes a sequence of distinct flushing processes, each distinct flushing process may be associated with one or more corresponding flushing completion parameters that may indicate when the associated distinct flushing process is complete. In such embodiments, S230 may function to determine when each distinct flushing process is complete, and in turn S230 may function to automatically close the flushing valves corresponding to each completed distinct flushing process. As a non-limiting example, a sequence of flushing processes may include a greywater flush followed by a subsequent indirect freshwater flush. S230 may function to initiate the greywater flush by automatically opening the greywater flushing valve, then in turn S230 may function to determine when the greywater flush is complete based on a corresponding greywater flushing completion parameter reaching (or exceeding and/or crossing) a greywater flushing completion threshold (e.g., a flushing timer measuring the duration of the greywater flushing process reaching or exceeding a flushing completion timer threshold). S230 may then function to automatically close the greywater flushing valve, and subsequently initiate an indirect freshwater flush by automatically opening the toilet flushing valve and running the toilet pump. In such an example, S230 may function to determine when the indirect freshwater flush is complete based on a corresponding indirect freshwater flushing completion parameter reaching (or exceeding and/or crossing) a flushing completion threshold (e.g., a flushing timer measuring the duration of the indirect freshwater flushing process reaching or exceeding a flushing completion timer threshold). S230 may then function to automatically close the toilet flushing valve. In such embodiments, S230 may function to determine that the entire flushing process is complete when the last flushing process of the flushing sequence has been determined to be complete.

In some embodiments, if S230 determines that the flushing process is incomplete (e.g., one or more of the flushing completion parameters has not reached, exceeded, or crossed one or more corresponding flushing completion thresholds) after all flushing process of the flushing sequence have been executed, S230 may function to notify the user that the flushing of the black tank is incomplete. In some such embodiments, S230 may function to prompt the user to either end the flushing process or select one or more alternate flushing processes that may be executed (e.g., direct/indirect freshwater flushing, greywater flushing, or external source flushing), and in turn S230 may function to execute the one or more selected alternate flushing processes. As a non-limiting example, if an initial flushing sequence includes a freshwater flushing of the black tank, and S230 determines that an insufficient volume or level of flushing water (freshwater) has passed through the black tank, S230 may prompt the user to select either a greywater flushing or an external flushing process to be executed.

In some preferred embodiments, upon determining a completion of the flushing of the black tank, S230 may function to automatically close the waste valve, such that the passage or pathway between the black tank and the sewage outlet may be closed. In some such embodiments, once the waste valve is closed, S230 may function to notify the user (e.g., via a user-controlled device and/or the waste management user interface) that the flushing of the black tank is complete. Additionally, or alternatively, in some embodiments, S230 may function to automatically close any open flushing valves (e.g. freshwater flushing valve(s), toilet flushing valve(s), greywater flushing valve(s)) to stop the flow of any flushing water into the black tank.

Black Tank Treatment Initiation

In some embodiments, S230 may function to query the user as to whether to initiate a treatment of the black tank. In such embodiments, the user may select an option to initiate the treatment of the black tank, and/or the user may select an option to skip the treatment of the black tank. Alternatively, in a second implementation, S230 may function to automatically begin an initiation of the treating of the black tank once the flushing of the black tank is determined to be complete and the waste valve is closed. Alternatively, in a third implementation, S230 may function to combine user input and automatic determination to initiate a treatment of the black tank.

Additionally, or alternatively, in some embodiments S230 may function to initiate a treatment of the black tank based on one or more automatic initiation parameters (as described in 2.15). As a non-limiting example, a completion of the flushing of the black tank may be identified based on an amount of time since the start of the flushing process being above a predetermined flushing duration and a sensor measurement of a volume of freshwater used during the flushing process being above a predetermined value. In turn, a treatment of the black tank may then be initiated based on a further evaluation of a sensor measurement of a level of treatment chemical in a treatment tank, such that a treatment may be initiated if the level of treatment chemical in the treatment tank may be greater than a predetermined level. It shall be noted that the preceding example is non-limiting, and S230 may function to evaluate or monitor any combination of one or more suitable automatic initiation parameters.

2.40 Treating the Black Tank

S240, which includes treating the black tank, may function to execute a treatment of the black tank with a volume of treatment solution for treating the black tank based on a completion of the flushing of the black tank and an initiating of the treatment of the black tank (as discussed in 2.3). Preferably, the volume of treatment solution may include a combination of a volume of freshwater and a predetermined amount or volume of one or more treatment chemicals. In one or more preferred embodiments, S240 may function to automatically control a treatment tank valve and/or a treatment chemical pump to deliver a predetermined amount or volume of treatment chemicals to the black tank. Preferably, S240 may further include initializing and/or monitoring one or more treatment completion parameters, such as a timer, an amount (e.g., level, volume, weight, etc.) of treatment chemical, an amount and/or concentration of treatment solution in the black tank, or the like. As used herein, a treatment completion parameter may be a computed or measured value of the waste management system that may function as an indicator that the treatment process is complete.

Preferably, S240 may include accumulating a volume of freshwater into the black tank. In some preferred embodiments in which the source of flushing water is a source of direct or indirect freshwater (as described in 2.3), S240 may function to accumulate a volume of freshwater in the black tank by opening, or maintaining an open state, of the flushing valve (e.g., the freshwater flushing valve or the toilet flushing valve) while closing, or maintaining a closed state, of the waste valve. Alternatively, in some embodiments, S240 may function to accumulate a volume of freshwater in the black tank by opening a freshwater valve in a fluid pathway between a freshwater inlet of the black tank and a suitable freshwater source, such as a freshwater tank, while closing or maintaining a closed state of the waste valve.

In one or more preferred embodiments, S240 may include introducing a quantity of treatment chemical into the black tank, such that the treatment chemical may form a treatment solution with the accumulated freshwater. In such embodiments, S240 may function to automatically operate a treatment chemical pump arranged in a treatment chemical pathway between a treatment chemical inlet of the black tank and an outlet of the treatment tank. Additionally, or alternatively, in some embodiments the treatment chemical pathway may include a treatment tank valve that may be electronically actuated to open or close the treatment chemical pathway. In such embodiments, S240 may function to automatically open the treatment tank valve to allow a flow of treatment chemicals into the black tank.

Determining a Completion of the Treatment Process

Preferably, S240 may function to determine a completion of the treatment process based on one or more automatically monitored treatment completion parameters of the waste management system. In such preferred embodiments, S240 may function to determine a completion of the treatment of the black tank based on treatment completion parameters including, but not limited to, an amount (e.g., weight, volume, height, or the like) of treatment solution in the black tank, a concentration of treatment solution in the black tank, an amount of freshwater accumulated in the black tank, an amount treatment chemical introduced into the black tank, a duration of the treating of the black tank (i.e., an amount of time since the start of the treating of the black tank), and/or any other suitable parameter for determining a completion of the flushing of the black tank.

In some embodiments, S240 may function to automatically close the flushing valve and/or the freshwater valve to discontinue the flow of freshwater into the black tank based on one or more treatment completion parameters. As a non-limiting example, S240 may continuously monitor a volume of freshwater introduced into the black tank via the flushing valve, and the flushing valve may be automatically closed if the volume of freshwater measured is above a predetermined threshold. Additionally, in some embodiments, S240 may function to automatically close the treatment tank valve and/or stop operation of the treatment chemical pump to discontinue a flow of treatment chemical into the black tank based on one or more treatment completion parameters. As a non-limiting example, S240 may function to continuously monitor a volume of treatment chemical introduced into the black tank via the treatment chemical pump, and the treatment chemical pump may be automatically shut down if the volume of treatment chemical is above a predetermined threshold. It shall be noted that any suitable treatment completion parameter or combination of parameters may be used to determine a discontinuation of freshwater accumulation and/or treatment chemical introduction in the black tank. In some embodiments, determining a completion of the treatment of the black tank may be based on both a discontinuation of the flow of treatment chemical and a discontinuation of freshwater accumulation. That is, in some embodiments, S240 may only function to determine a completion of the treatment of the black tank if both the treatment chemical flow and the freshwater flow into the black tank have been stopped.

In some preferred embodiments, upon determining a completion of the treatment of the black tank, S240 may function to notify the user (e.g., via a user-controlled device and/or the waste management user interface) that the treating of the black tank is complete.

In some embodiments in which a distinct grey tank may be included, S240 may function to query the user as to whether to initiate a draining of the grey tank. In such embodiments, the user may select an option to initiate the draining of the grey tank, and/or the user may select an option to skip the draining of the grey tank. Alternatively, in a second implementation, S240 may function to automatically initiate a draining of the grey tank once the treating of the black tank is determined to be complete. Alternatively, in a third implementation, S240 may function to combine user input and automatic determination to initiate a draining of the grey tank.

2.50 Draining the Grey (Water) Tank

Figure 6:
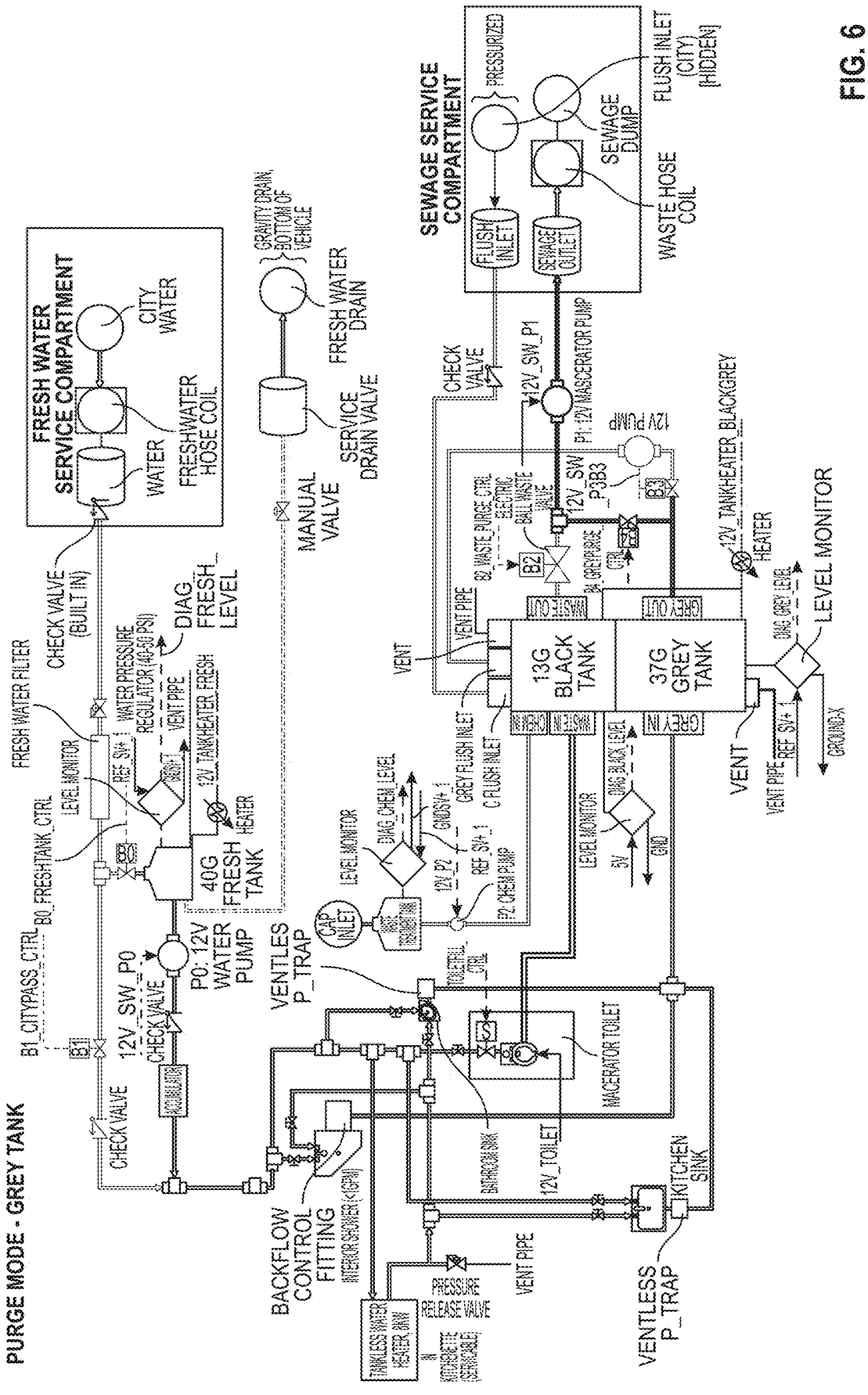
FIG. 6 illustrates an example schematic of a water and waste management subsystem in a grey tank purging mode in accordance with one or more embodiments of the present application.

Optionally, in embodiments which may include a distinct grey tank separate from a distinct black tank, S250, which includes draining the grey tank, may function to purge, dump or drain waste and/or wastewater from the grey tank based on an initiating of the draining of the grey tank, as shown by way of example in FIG. 6 (open/operating fluid pathways during grey tank draining/purging shown in bold in FIG. 6). Preferably, S250 may include automatically opening a grey tank waste outlet valve to allow waste and/or wastewater to flow out of the grey tank. The grey tank waste outlet valve, as used herein, may refer to an automatic control valve (e.g., an electric ball valve, a motorized valve, or other automatically controllable valve) that may be arranged in a grey waste fluid pathway downstream of the grey tank and upstream of the sewage outlet and may function to open or close a waste passage between the grey tank and the sewage outlet.

Additionally, or alternatively, in some embodiments, the grey waste fluid pathway may merge with the waste passage of the black tank. In some such embodiments, the grey waste fluid pathway may include an outlet into the waste passage of the black tank downstream of the waste outlet valve of the black tank and upstream of the waste pump arranged in the waste passage. In such embodiments, the waste pump may be automatically activated or operated (e.g., by a pump control signal transmitted by the waste management control system) to induce or assist the draining of greywater from the grey tank, through the grey waste fluid pathway, into the waste passage, and out through the sewage outlet.

In some preferred embodiments, S250 may include continually monitoring one or more grey tank draining completion parameters (e.g., via the waste management control system) for determining a completion of the draining of the grey tank. As used herein, a grey tank draining completion parameter may comprise a computed or measured value of the waste management system (such as wastewater level, grey tank draining time, etc.) that may function as an indicator that the draining of the grey tank may be complete. In some preferred embodiments, S250 may function to close the grey tank waste outlet valve based on identifying a completion of the draining of the grey tank.

Preferably, S250 may include dumping or draining waste and/or wastewater from the grey tank through the grey waste fluid path. In some preferred embodiments, S250 may function to automatically open the grey tank waste outlet valve to permit a draining of waste and/or wastewater from the waste outlet of the grey tank to the external dump site. In some embodiments, the draining may be driven or assisted by gravity, such that waste and wastewater fall through the outlet of the grey tank, through a grey waste passage between the outlet of the grey tank and the sewage outlet, and out of the sewage outlet.

In some embodiments, a draining of the grey tank may be performed or executed based on initializing and executing a waste transfer process that may function to transfer waste and/or wastewater from the grey tank to the black tank. In such embodiments the grey tank may be fluidly coupled to the black tank via a waste transfer pathway, and the waste management system may include a waste transfer valve which may be arranged in the waste transfer pathway downstream of the grey tank and upstream of the black tank. In such embodiments, the waste transfer process may function to automatically equalize and/or reduce an imbalance between the waste and/or wastewater stored in the grey tank and the waste and/or wastewater stored in the black tank. In one or more embodiments, the waste transfer process may be initialized based on an evaluation of one or more automatic waste transfer initiation parameters including, but not limited to, an amount (e.g., weight, volume, height, or the like) of waste and/or wastewater in the grey tank, an amount of waste and/or wastewater in the black tank, a ratio of an amount of waste and/or wastewater in the grey tank to an amount of waste and/or wastewater in the black tank, and/or any other suitable parameter or combination thereof suitable for determining an automatic initiation of the waste transfer process. Alternatively, the waste transfer process may be initiated by a user via the waste management user interface. Determining a Completion of the Grey Tank Draining Process Preferably, S250 may function to determine a completion of the draining of the grey tank based on the one or more monitored grey tank draining completion parameters, which may include, but are not limited to, an amount (e.g., weight, volume, height, or the like) of waste and/or wastewater remaining in the grey tank, an amount of waste and/or wastewater drained from the grey tank, a duration of the draining process of the grey tank (i.e., an amount of time since the start of the draining of the grey tank), and/or any other suitable parameter or combination thereof for determining a completion of the draining of the grey tank. In some preferred embodiments, one or more sensors (e.g., weight sensors, level sensors, or the like) may be used to measure and/or compute one or more grey tank draining completion parameters. Preferably, S250 may function to determine a completion of the draining process once each of the one or more grey tank draining completion parameters reaches (or exceeds and/or crosses) a predetermined value. In some embodiments, the one or more grey tank draining completion parameters may be selected by a user.

Preferably, upon determining the completion of the draining of the grey tank, S250 may function to automatically close the grey tank waste outlet valve. Additionally, in some preferred embodiments, S250 may function to notify the user (e.g., via a user-controlled device and/or the waste management user interface) that the grey tank has been drained upon completion of the draining of the grey tank.

2.60 Disconnecting the Waste Management System

S260, which includes disconnecting the waste management system, may function to disconnect the sewage outlet from the external dumping station inlet based on determination of a completion of the waste disposal and cleaning workflow (as described in 2.1). Preferably, S260 may function to notify the user (e.g., via a user-controlled device and/or the waste management user interface) of a completion status of the waste disposal and cleaning workflow. Additionally, or alternatively, in some preferred embodiments, S260 may notify the user that the sewage outlet may be safely disconnected. In such embodiments, S260 may function to ensure that the waste outlet valve and the grey tank waste outlet valve are closed such that any flow to the sewage outlet has been discontinued. In some embodiments, upon determining the completion of the waste disposal and cleaning workflow, the user may disconnect the sewage outlet from the external dump site.

Preferably, S260 may function to determine a completion status of the waste disposal and cleaning workflow based on a completion of one or more waste disposal and cleaning workflow processes. Such processes may include, but are not limited to, the draining of the black tank, the flushing of the black tank, the treating of the black tank, and/or the draining of the grey tank. As a non-limiting example, upon determining that the draining, flushing, and treating of the black tank have been completed, and the draining of the grey tank has been completed (as described in 2.2, 2.3, 2.4, and 2.5), S260 may function to determine a completion of the waste disposal and cleaning workflow. In turn, S260 may function to close or maintain a closing of the waste outlet valve and the grey tank waste outlet valve. In such an example, once the closed state of the waste outlet valve and the grey tank waste outlet valve are verified, S260 may notify the user that the sewage outlet may be disconnected.

It shall be noted that, in some embodiments, the completion status of the waste disposal and cleaning workflow may not be based on a completion status of each waste disposal and cleaning process of the workflow, but instead may be based on a completion status of some, but not all, of the processes of the workflow. Additionally, or alternatively, in some embodiments, a completion of the waste disposal and cleaning workflow may be initiated by a user and/or automatically initiated regardless of a completion status of the waste disposal and cleaning processes of the workflow. As a non-limiting example, a user may initiate a completion of the workflow (e.g., via a shut-down command in the waste management user interface) such that S260 may function to close the waste outlet valve and the grey tank waste outlet valve regardless of a completion status of any waste disposal and cleaning processes of the workflow.

In some preferred embodiments, S260 may include an automatic monitoring of a connection status of the sewage outlet; in some such embodiments, S260 may function to update the user and/or to update the waste management system as to the connection status of the sewage outlet. In some embodiments, S260 may also determine the connection status of the sewage outlet. In such embodiments, S260 may additionally function to notify the user via a confirmation notification confirming the disconnection of the sewage outlet from the external dump site.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A method for an automated cleaning of a respective waste tank in a recreational vehicle, the method comprising:
   receiving, via one or more computers implementing one or more sensors, a cleaning initiation signal for initiating a cleaning of the respective waste tank, wherein the respective waste tank is one of a first waste tank or a second waste tank, wherein the second waste tank corresponds to a grey tank;
   automatically purging first waste material from the first waste tank when the cleaning initiation signal is for the first waste tank, wherein purging the first waste tank includes:
      pumping the first waste material out of the first waste tank through a first waste valve of a first waste passage positioned between the first waste tank and a waste outlet of the recreational vehicle, and
      pumping the first waste material through the first waste valve to the waste outlet of the recreational vehicle;
   automatically purging second waste material from the grey tank when the cleaning initiation signal is for the grey tank, wherein purging the grey tank includes:
      pumping the second waste material out of the grey tank through a second waste passage that merges with the first waste passage at a second waste valve of the first waste passage that is downstream of the first waste valve and upstream of a waste pump arranged in the first waste passage, and automatically activating the waste pump to pump the second waste material through the second waste valve of the first waste passage to the waste outlet of the recreational vehicle;

executing, via the one or more computers implementing the one or more sensors, an automated flushing of the respective waste tank with a flushing liquid based on sensor data identifying that a level of waste material within the respective waste tank indicates that the purging of the respective waste tank is complete, wherein flushing the respective waste tank includes opening a flush inlet valve upstream of the respective waste tank to guide a flow of flushing liquid into an inlet of the respective waste tank and out through the waste outlet of the recreational vehicle; and transmitting, via the one or more computers implementing the one or more sensors, an electronic communication to a user interface that indicates a completion of the flushing of the respective waste tank based on a flushing completion signal indicating that a process of the automated flushing of the respective waste tank is complete.

2. The method according to claim 1, wherein:

the flushing liquid comprises greywater sourced from the grey tank of the recreational vehicle, and opening the flush inlet valve causes the greywater to flow from the grey tank to the inlet of the first waste tank.

3. The method according to claim 2, wherein flushing the respective waste tank further comprises:

opening a freshwater flush inlet valve upstream of the respective waste tank and downstream of a freshwater tank of the recreational vehicle to direct a flow of freshwater into the respective waste tank, and closing the freshwater flush inlet valve based on at least one freshwater flush completion parameter has reached or crossed a corresponding freshwater flush completion threshold value.

4. The method according to claim 1, wherein automatically purging the first waste material from the first waste tank further comprises:

automatically opening the first waste valve downstream of the first waste tank and upstream of the waste outlet, and automatically activating the waste pump downstream of the first waste valve and upstream of the waste outlet.

5. The method according to claim 1, further comprising:

transmitting, via the one or more computers, a purging completion communication to the user interface that indicates a completion of the purging of the respective waste tank.

6. The method according to claim 5, wherein:

the purging completion communication comprises a user prompt to confirm a continuation of the automated cleaning of the respective waste tank, and executing the automated flushing of the respective waste tank is based on receiving a confirmation response to the user prompt.

7. The method according to claim 1, wherein the purging of the respective waste tank is complete is further based on that a purging duration has reached or exceeded a purging duration threshold value.

8. The method according to claim 1, wherein executing the automated flushing of the respective waste tank is further based on that a level of flushing liquid contained in a flushing liquid tank of the recreational vehicle is greater than a minimum threshold level of flushing liquid.

9. The method according to claim 1, wherein the electronic communication comprises a user prompt to confirm or skip a treatment process of the respective waste tank, wherein the method further comprises:

executing an automatic treatment of the respective waste tank with a treatment solution based on receiving, via the one or more computers, a confirmation response to the electronic communication.

10. The method according to claim 1, further comprising:

executing an automatic treatment of the respective waste tank with a treatment solution based on that the automated flushing of the respective waste tank is complete, wherein executing the automatic treatment of the respective waste tank includes automatically pumping a volume of treatment chemical into the respective waste tank.

* * * * *